(12) United States Patent
Cholleti et al.

(10) Patent No.: US 7,802,070 B2
(45) Date of Patent: Sep. 21, 2010

(54) APPROACH FOR DE-FRAGMENTING PHYSICAL MEMORY BY GROUPING KERNEL PAGES TOGETHER BASED ON LARGE PAGES

(75) Inventors: Udayakumar Cholleti, Cupertino, CA (US); Sean McEnroe, North Borough, MA (US); Stan J. Studzinski, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 490 days.

(21) Appl. No.: 11/452,768

(22) Filed: Jun. 13, 2006

(65) Prior Publication Data

US 2007/0288719 A1 Dec. 13, 2007

(51) Int. Cl.
G06F 12/00 (2006.01)
G06F 13/00 (2006.01)
G06F 13/28 (2006.01)

(52) U.S. Cl. .................. 711/170; 711/165; 711/156; 711/147

(58) Field of Classification Search .................. 711/170, 711/156, 165, 147
See application file for complete search history.

(56) References Cited

U.S. PATENT DOCUMENTS

| 4,787,031 A | 11/1988 | Karger et al. |
| 4,961,134 A * | 10/1990 | Crus et al. .................. 707/8 |
| 5,440,746 A * | 8/1995 | Lentz .................. 345/504 |
| 5,574,944 A | 11/1996 | Stager |
| 5,577,231 A | 11/1996 | Scalzi et al. |
| 5,659,798 A | 8/1997 | Blumrich et al. |
| 5,765,198 A | 6/1998 | McCrocklin et al. |
| 5,802,341 A | 9/1998 | Kline et al. |
| 5,918,244 A | 6/1999 | Percival |
| 6,052,699 A * | 4/2000 | Huelsbergen et al. ....... 707/206 |
| 6,085,296 A | 7/2000 | Karkhanis et al. |
| 6,125,430 A | 9/2000 | Noel et al. |
| 6,349,355 B1 * | 2/2002 | Draves et al. .................. 711/6 |
| 6,366,994 B1 * | 4/2002 | Kalyur .................. 711/173 |

(Continued)

OTHER PUBLICATIONS

Corsi, CS372 class notes 11-13 from www.cs.utexas.edu/users/lorenzo/corsi/cs372/03F/notes/11-13.pdf, Nov. 21, 2003, 5 pages.

(Continued)

*Primary Examiner*—Stephen C Elmore
*Assistant Examiner*—Mark A Giardino, Jr.
(74) *Attorney, Agent, or Firm*—Osha • Liang LLP

(57) ABSTRACT

An approach for de-fragmenting physical memory generally involves grouping kernel pages together based on large pages. The de-fragmentation procedure is triggered, such as by a kernel page-freelist being empty. The first user page from a user page-freelist is selected, marked as a kernel page (e.g., by setting a P_KERNEL bit), added to the kernel page-freelist, and then the large page in which the selected page is identified. Starting with the first small page within the large page, the small pages are processed by the de-fragmentation procedure, resulting in as many small pages as possible being marked as kernel pages and then added to the kernel page-freelist. Later, when a large page is coalesced, the number of kernel pages that must be relocated within the large page being coalesced is reduced or eliminated as a result of the de-fragmentation of the physical memory.

30 Claims, 7 Drawing Sheets

U.S. PATENT DOCUMENTS

| | | | |
|---|---|---|---|
| 6,553,435 | B1 | 4/2003 | Normoyle et al. |
| 6,594,708 | B1 | 7/2003 | Slaughter et al. |
| 6,622,226 | B1 * | 9/2003 | Dussud ................... 711/159 |
| 6,804,729 | B2 | 10/2004 | Swanberg |
| 6,922,765 | B2 | 7/2005 | Jacobs |
| 7,007,146 | B2 | 2/2006 | Romanufa et al. |
| 7,093,097 | B2 | 8/2006 | Herr et al. |
| 7,159,094 | B1 * | 1/2007 | Cholleti et al. .............. 711/170 |
| 2002/0108025 | A1 | 8/2002 | Shaylor |
| 2004/0015622 | A1 | 1/2004 | Avery |
| 2004/0187135 | A1 | 9/2004 | Pronovost et al. |
| 2005/0050295 | A1 | 3/2005 | Noel et al. |
| 2005/0086451 | A1 | 4/2005 | Yates et al. |
| 2005/0120080 | A1 | 6/2005 | Weinreb et al. |
| 2005/0144422 | A1 | 6/2005 | McAlpine et al. |
| 2005/0240748 | A1 | 10/2005 | Yoder |
| 2005/0289550 | A1 | 12/2005 | Blackmore et al. |
| 2006/0064562 | A1 | 3/2006 | Mohideen et al. |
| 2006/0107020 | A1 | 5/2006 | Stillwell et al. |
| 2006/0236063 | A1 | 10/2006 | Hausauer et al. |
| 2006/0282839 | A1 | 12/2006 | Hankins et al. |
| 2006/0294165 | A1 * | 12/2006 | Bacon et al. ................ 707/206 |
| 2007/0038891 | A1 | 2/2007 | Graham |
| 2007/0169024 | A1 | 7/2007 | Drepper |
| 2007/0288718 | A1 | 12/2007 | Cholleti et al. |
| 2008/0005495 | A1 | 1/2008 | Lowe et al. |

OTHER PUBLICATIONS

McDougall et al., "Solaris Internals Kernel Architecture & Implementation", 2001, 128 pages.
"Solaris 10 What's New," Sun Microsystems 4150 Network Circle, Santa Clara CA 95054, USA, PartNo. 817-0547-18, May 2006, pp. 1-162 (162 pages).
Rubini et al., "Linux Device Driver", $2^{nd}$ Edition, Jun. 2001, Chapter 2 and 13, 95 pages.
Armstrong et al., "Advanced Virtualization Capabilities of POWER5 Systems", Sep. 2005, 15 pages.
IP.COM, "Mechanism for Dynamic Registering and Notifying Hypervisor Clients of Updates to High-Use Translation Control Entries", Aug. 2004, 3 pages.
Gibbs et al., "Advanced POWER Virtualization on IBM eServer p5 Servers", Nov. 2005, 432 pages.
Matsubara, "IBM eServer pSeries 670 and pSeries 690 System", Jan. 2005, 266 pages.

* cited by examiner

APPROACH FOR DE-FRAGMENTING PHYSICAL MEMORY BY GROUPING KERNEL PAGES TOGETHER BASED ON LARGE PAGES

PRIORITY CLAIM AND RELATED APPLICATIONS

This application claims domestic priority under 35 U.S.C. §120 as a continuation-in-part of U.S. non-provisional application Ser. No. 11/451,751, filed Jun. 12, 2006, entitled "RELOCATING PAGE TABLES," naming Udayakumar Cholleti, Sean McEnroe, and Stan J. Studzinski as inventors, the entire disclosure of which is hereby incorporated by reference for all purposes as if fully set forth herein.

This application is related to: (1) co-pending non-provisional application Ser. No. 11/451,966, filed Jun. 12, 2006, entitled "PHYSICAL ADDRESS MAPPING FRAMEWORK," naming Udayakumar Cholleti, Sean McEnroe, and Stan J. Studzinski as inventors; (2) co-pending non-provisional application Ser. No. 11/479,664, filed Jun. 30, 2006, entitled "IDENTIFYING RELOCATABLE KERNEL MAPPINGS," naming Udayakumar Cholleti, Sean McEnroe, and Stan J. Studzinski as inventors; and (3) co-pending non-provisional application Ser. No. 11/479,750, filed Jun. 30, 2006, entitled "KERNEL MEMORY FREE ALGORITHM," naming Udayakumar Cholleti, Sean McEnroe, and Stan J. Studzinski as inventors.

BACKGROUND

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section.

The physical memory of a computing system is comprised of pages that are allocated as needed among different processes that are running on the system. Some pages are allocated to the kernel, and therefore such pages are referred to as kernel pages, while other pages are allocated to one or more user processes (e.g., applications), and therefore such pages are referred to as user pages.

At the startup of the system, the kernel process is the first to be executed, and pages in the physical memory are allocated to the kernel (e.g., kernel pages). When one or more applications are started, additional pages within the physical memory are allocated to those applications (e.g., user pages). Since pages are typically allocated one after another according to the ordering of the pages in the physical memory, at the end of starting up the system, the kernel pages are generally grouped together within the physical memory while the user pages are grouped together by application.

Over time, some processes will end, freeing up the associated pages in the physical memory, while existing processes may require additional pages in the physical memory or new processes will start that require some of the pages in the physical memory. In some systems, the kernel pages and user pages within the physical memory can be intermixed. As a result of different processes starting and ending and processes needing less or more memory, the kernel pages tend to no longer be grouped together within the physical memory and are instead intermixed among user pages for the applications. Similarly, the pages for different applications can become intermixed among each other and among the kernel pages.

The intermixing of kernel pages and user pages is referred to as fragmentation because the kernel pages and the user pages are no longer grouped together within the physical memory. For example, FIG. 1B illustrates a physical memory 150 comprised of a number of kernel pages and user pages for three different applications denoted as A, B, and C. Because the kernel pages and user pages are intermixed, physical memory 150 can be characterized as being fragmented.

Fragmentation can be a problem in systems that support one or more large pages that are each comprised of two or more pages of a minimum size for the system. As an example, a database application such as that produced by Oracle Corporation often prefers to use larger pages for improved performance, such as 4 MB pages that are comprised of contiguous sets of 512 8K pages in a system with a minimum page size of 8K. As a simplified example, in FIG. 1B, assume that each page 152 is 8K in size and that the system supports a large page size of 32K, which is made up of four contiguous 8K pages. If user application C needs a 32K page, the system can coalesce a 32K large page, such as large page 154a, based on the small 8K pages 152a, 152b, 152c, and 152d. However, if any of the 8K pages are currently being used by another process, the contents of the 8K pages need to be moved to free up the smaller pages.

Moving a user page is typically not difficult or resource intensive because a user page can be flushed to disk. However, moving a kernel is typically difficult, or perhaps not even possible. For example, in some memory systems, kernel pages cannot be moved at all, and therefore if only one page within a large page is allocated to the kernel, the large page cannot be coalesced because the kernel page cannot be moved. As another example, in other memory systems the kernel pages can be moved, or relocated, and therefore such kernel pages can be characterized as being relocatable kernel pages. However, even if relocating kernel pages is possible, kernel page relocation is generally more difficult than relocating user pages. Therefore, kernel page relocation is generally a more resource intensive operation and can significantly impede the performance of the system.

One approach for de-fragmenting a physical memory is to reboot the system. Because pages are typically allocated first to the kernel and therefore are grouped together within the physical memory, with user pages being allocated later as each application is started, the result of rebooting the system is that the physical memory has little, if any, fragmentation among the kernel pages and the user pages.

However, a significant drawback of rebooting the system to de-fragment the physical memory is the time required for rebooting the system, which can be significant. Furthermore, restarting some applications, such as an Oracle database, can also require a significant amount of time. As a result, restarting the system can take a half hour or more, and then restarting each large application can take a half hour or more. For a system that requires high availability for mission critical applications, the time to reboot the system and then restart the large application can result in users being unable to use the application for an unacceptably long period of time. Thus, the users of the system is faced with choosing between making the system unavailable by rebooting to increase performance of the application, or maintaining the required availability by forgoing rebooting the system but having to accept the degraded performance of the application due to the inability of the application to use a sufficient number of large pages.

SUMMARY

An approach for de-fragmenting a physical memory generally involves grouping kernel pages together based on large pages. In one embodiment, a kernel page-freelist is created in addition to one or more user page-freelists. A user page is selected from the user page-freelist, and an indicator for the user page is changed to designate that the user page is changed to a kernel page. The new kernel page is then added to the kernel page-freelist based on the indicator designating the page as a kernel page. Then a contiguous set of pages, such as a large page, is identified that includes the new kernel page. Another user page within the contiguous set of kernel pages is selected, and a determination is made whether the other user page can be added to the kernel page-freelist. Based on determining that the other user page can be added to the kernel page-freelist, another indicator for the other page is change to designate that the other user page is changed to another kernel page. The other kernel page is then added to the kernel page-freelist.

Additional user pages within the contiguous set of pages can be selected and processed as above. If a user page is determined to not be capable of being added to the kernel page-freelist, that user page is skipped. Each page within the contiguous set of pages can be processed in a similar manner. If a user page can be marked as a kernel page but is not free, the user page can be relocated, such as by flushing the contents to disk. As a result of the de-fragmentation procedure, the kernel page-freelist is populated with free pages that are marked as kernel pages, and the kernel pages are grouped within certain large pages. As a result, when a large user page is coalesced, the number of kernel pages that would have to be relocated in a system that allows relocating of kernel pages is reduced. Similarly, when a large user page is coalesced in a system that does not allow relocating of kernel pages, the number of large pages that would not be capable of being coalesced due to the presence of a kernel page within the large page is reduced.

In some implementations, any pages that cannot be marked as kernel pages and added to the kernel page-freelist are skipped, and therefore such skipped pages can be described as "holes." One or more techniques for removing such holes can be used. For example, multiple passes through the pages of the contiguous set of pages can be employed, such that holes from previous passes can later be marked and then added to the kernel page free-list. As another example, when a page is unlocked, a check can be made as to whether the page is a hole, and if so, the page can be processed to determine if the page can be marked as a kernel page. As yet another example, when a page is freed, a check can be made as to whether the page is a hole, and if so, the page can be processed to determine if the page can be marked as a kernel page.

In other implementations, instead of populating a kernel page-freelist, the de-fragmentation procedure can be applied to large pages to populate a user page-freelist by changing indicators to designate that kernel pages are changed to user pages. In yet other implementations, populating both a kernel page-freelist and a user page-freelist can be employed in the same system.

In addition, multiple large page sizes can be accommodated for a given system, including multiple large page sizes for both user pages and kernel pages. Furthermore, instead of having separate user page-freelists and kernel page-freelists, free user pages and free kernel pages can be listed in the same free-list and distinguished as being a user page or a kernel page based on an indicator.

According to other aspects, the invention encompasses a machine-readable medium, a carrier wave, an apparatus, and a system configured to carry out the foregoing functions.

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION OF EMBODIMENTS

Figure 1A:
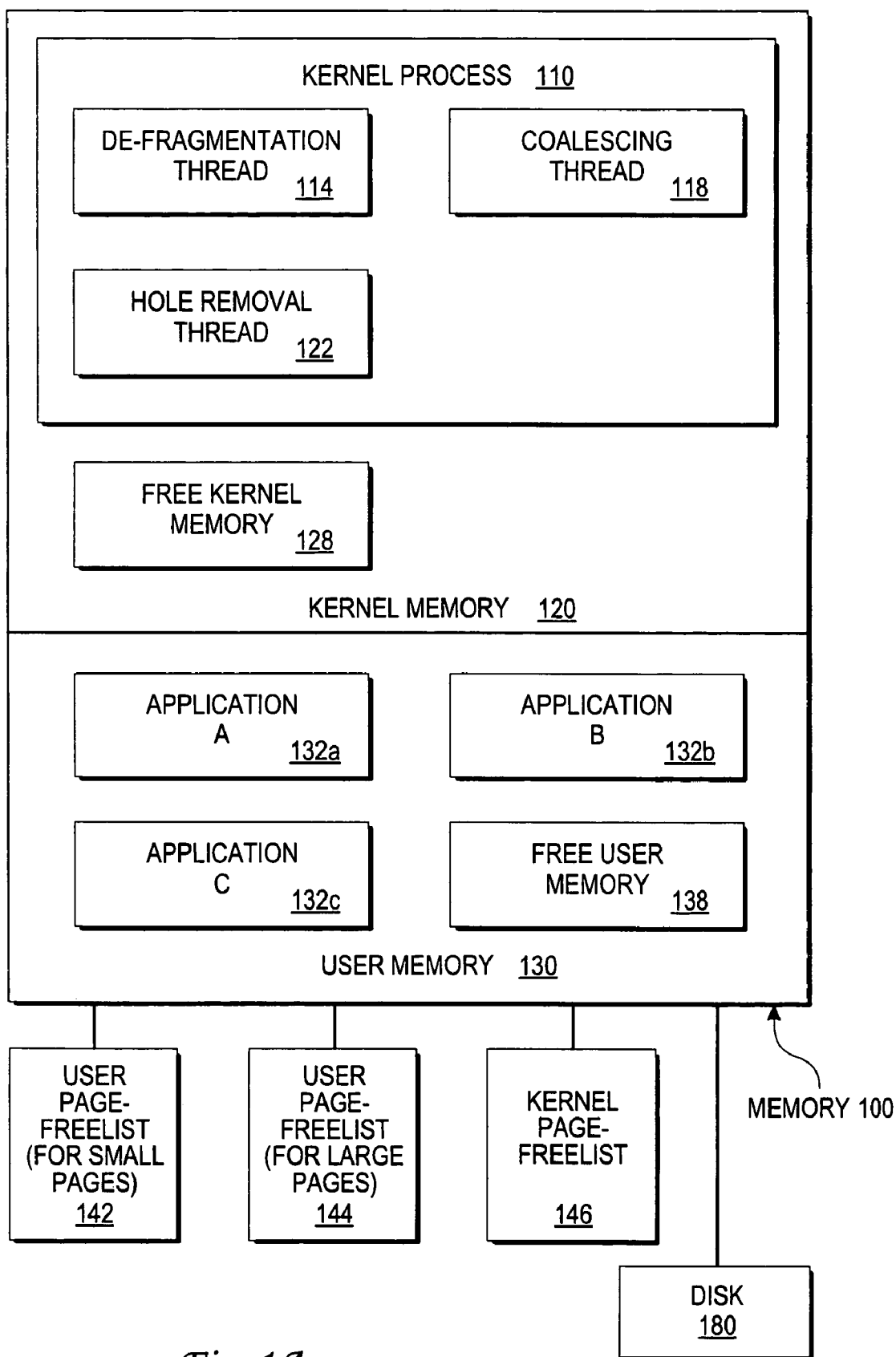
FIG. 1A is a block diagram that depicts a high level overview of a system for de-fragmenting a physical memory, according to an embodiment.

A method and apparatus for de-fragmenting a physical memory is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

In the following description, the various functions shall be discussed under topic headings that appear in the following order:

1.0 Structural and Functional Overview
1.1 Definitions and Basic Concepts
1.2 Structural Overview
1.3 Functional Overview
2.0 Initiating De-Fragmentation of Physical Memory
2.1 Designating Pages as Kernel Pages and User Pages
2.2 Creating a Kernel Page-Freelist
2.3 Triggers for Starting De-Fragmentation
2.4 Selecting a Large Page to Process
2.5 Adding the First Page to the Kernel Page-Freelist
3.0 Populating a Kernel Page-Freelist
3.1 Exclusive Lock Can Be Obtained for a User Page
3.2 Exclusive Lock Cannot Be Obtained for a User Page
3.3 Processing Additional Pages in the Large Page
4.0 Coaliscing a Large Page
5.0 Removing "Holes" After a First Pass Over a Large Page
5.1 Multiple Passes Over a Large Page 5.2 Removing a Hole When a User Page is Unlocked
5.3 Removing a Hole When a User Page is Freed
5.4 "Automatic" Removal of Holes
6.0 Implementation Mechanisms
7.0 Extensions and Alternatives
7.1 General Considerations
7.2 Populating a User Page-Freelist
7.3 Multiple Large Page Sizes
7.4 Separate vs. Combined Page-Freelists for User Pages and Kernel Pages 1.0 Structural and Functional Overview Techniques are provided for de-fragmenting a physical memory so that after the de-fragmentation procedure is performed, kernel pages and user pages are generally grouped together within large pages. As a result, each large page within the physical memory includes mostly pages of one type or the other, or in the best case, only pages of one type or the other. Then when a large user page needs to be coalesced, a large page that already includes mostly user pages can be turned into the large page with only a few kernel pages needing to be relocated, or in the best case, the large page includes only user pages so that no kernel pages need to be relocated. Thus, the techniques described herein effectively segregate user pages and kernel pages based on large pages so that coalescing large user pages requires fewer kernel page relocations than would otherwise be required for a physical memory that has not been de-fragmented. For systems in which kernel pages cannot be relocated, the de-fragmentation of physical memory by grouping kernel pages and user pages together reduces the number of large pages that cannot be coalesced due to the presence of a kernel page within the large page.

1.1 Definitions and Basic Concepts

This section provides definitions of certain terms that are used herein to describe the approaches for managing functionalities of a system and in the claims. In addition, some basic concepts related to physical memory that are pertinent to the discussion of the techniques herein are described.

As used herein, the term "page" refers to the smallest unit of physical memory in a computing system. For example, Intel's x86 current architecture typically uses 4K pages, and Sun Microsystems' SPARC current architecture typically uses 8K pages. However, any page size and any type of architecture can be used with the techniques described herein.

A page in the physical memory can be identified based on the physical address. For example, the first 8K page is located at address 0, with the second 8K page located at address 1, and so on. As another example the first 32K large page in an 8K minimum page size system is typically located from address 0 to address 3, the second 32K page is located from address 4 to address7, and so on.

A page in the physical memory can also be identified based on the page frame number, or pfn, which can be thought of as the page number. For the smallest supported page, the pfn of a particular page is the same as the page's physical address (e.g., the address of the sixth page is 5, and the pfn of the sixth page is also 5, keeping in mind that the first page's address and pfn is 0).

As used herein, the term "kernel page" refers to a page that is used by the kernel process of an operating system that is executing on the computer system. Note that a kernel page may or may not be designated as a kernel page, such as by setting the P_KERNEL bit as described below.

As used herein, the term "user page" refers to a page that is used by a non-kernel process on the computer system, such as a process that is part of an application that is executing on the system, typically at the request of a user.

As used herein, the term "free" refers to a state of a page that is characterized by the page being unused so that the page can be used by a process, whether a kernel process or a user (e.g., non-kernel) process. As used herein, the term "mapped" refers to a state of page that is characterized by the page being used and therefore a mapped page contains one or more data items.

As used herein, the term "page-freelist" is a list of pages that are free. The page-freelist can be implemented in any suitable manner, such as a linked list of free pages. If the computing system supports multiple page sizes, there is generally a page-freelist for each supported page size. For example, if the computing system includes multiple page size support (MPSS), such as in the SPARC architecture, there is generally a page-freelist for each supported size. Thus, for MPSS, the page sizes typically supported are 8K, 64K, 512K, and 4 MB (4096K), and therefore, a page-freelist for each of these four sizes is maintained by the system.

Generally, computing systems do not distinguish between user pages and kernel pages for the page-freelists. However, in some implementations of the approaches described herein, there is a user page-freelist that identifies the free user pages for each supported page size plus a kernel page-freelist that identifies the free kernel pages. For example, for MPSS, there would be a page-freelist for free 8K pages, another page-freelist for free 64K pages, and so on for free 512K and free 4 MB pages, plus a kernel page-freelist for free 8K kernel pages. The page structure for each page can include a flag, such as a P_KERNEL bit, that when set (e.g., the value of the bit is "1") indicates that the page is a kernel page and therefore when freed is to be included on the kernel page-freelist. If the bit is not set (e.g., the value of the P_KERNEL bit is "0"), then the page is a user page and therefore would be included in the user page-freelist for the appropriate page size of the particular user page.

As used herein, the term "large page" refers to a set of two or more contiguous pages. For example, for a 64K large page in MPSS, there are eight contiguous 8K pages. Similarly, for a 512K large page, there are 64 contiguous 8K pages, and for a 4 MB large page, there are 512 contiguous 8K pages. A large page is sometimes referred to as a "large page chunk" or simply a "large chunk."

Note that whether or not a large page can be accessed and used as a single page of the specified size depends on whether or not the large page has been coalesced. A large page is coalesced when the page flag in the page structure of the large page's constituent pages has been set to indicate the size of the large page. For example, in MPSS, a page bit is set to "0" to indicate a page size of 8K, to "1" to indicate a page size of 64K, to "2" for 512K, and to "3" for 4 MB. However, even if a large page is not coalesced, the constituent small pages that correspond to the large page if coalesced are sometimes still referred to as a large page. Therefore, the term "coalesced large page" is used herein to denote a contiguous set of pages that have been coalesced into a large page, whereas the term "large page" simply refers to the set of two or more contiguous pages that are not coalesced.

A large page in the physical memory can be identified based on the physical address. For example, the first 512K large page starts at address 0 and ends at address 511, the second 512K large page starts at address 512 and ends at address 1013, etc. A large page can also be identified by the pfn of the large page. For example, the first 512K large page has a pfn of 0, the second 512 k large page has a pfn of 1, etc.

For a particular address location, the pfn of the corresponding large page can be found by dividing the address by the size of the large page and discarding the remainder of that division. For example, the pfn of the 512K page that includes the 8K page at address 784 is found as follows: divide the address 784 by 512 to get 1.53125, then drop the remainder of 0.53125 to get the pfn of 1.

Note that the techniques described herein are for de-fragmenting physical memory, which is to be distinguished from virtual memory. As used herein, the term "physical memory" refers to the actual metal memory chip. Physical memory addresses refer to addresses within physical memory. In contrast, the term "virtual memory" refers to a logical construct that a user process or application uses and which may, but need not necessarily, be mapped to one or more physical memory locations. For example, a virtual memory can include addresses that are allocated to an application, but which have not yet been allocated within the physical memory. When such addresses in the virtual memory are accessed, corresponding locations within the physical memory are allocated.

Generally, there is a kernel virtual memory for use by the kernel process, and then each user process is associated with a separate virtual user memory. When kernel virtual memory is allocated, corresponding portions of the physical memory are also allocated. However, when user virtual memory is allocated, corresponding portions of the physical memory are typically not allocated. Only when a user process touches or uses part of the user virtual memory is corresponding physical memory allocated to the user process.

Virtual memory, whether for the kernel or for a user process, has a separate address space, such as a kernel virtual address space for the kernel virtual memory and one or more user virtual address spaces for each user virtual memory. A translation lookaside buffer (TLB) maps virtual address space to physical address space. However, the TLB is typically limited in size, such as being only 512K or 1024K. As a result, when small pages are used in physical memory, the TLB can only map a limited portion of the physical memory. For example, for a TLB having a size of 1024K and a physical memory with 8K pages, the TLB can only map 8 MB (e.g., 1024×8K) of the physical memory, even though the physical memory is generally much larger, such as a physical memory comprised of several GB of capacity or even TB worth of capacity. The amount of physical memory that can be mapped by the TLB is referred to as the "reach" of the TLB.

As a result of the limited reach of the TLB when using small page sizes, user processes are likely to encounter TLB "misses" because the desired physical memory address is not mapped in the TLB, which can significantly impede performance. To minimize the number of TLB misses, computing systems employ larger page sizes. Thus, for a system that supports 512K pages, a TLB of size 1024K can have a reach of up to 512 MB (e.g., 1024×512K). Large page sizes can increase the TLB reach, thereby minimizing TLB misses and resulting in improved performance. However, in systems that support one or more large page sizes, coalescing the large pages can be difficult or even prevented by fragmentation of the physical memory due to intermixed kernel pages and user pages. As a result, the reach of the TLB may be limited to significantly less than the potentially largest reach, thereby impacting performance of the system. Hence, the approaches described herein help to de-fragment the physical memory, thereby allowing for more large pages to be coalesced, which in turn increases the TLB reach and therefore improves performance by minimizing TLB misses.

1.2 Structural Overview

FIG. 1A is a block diagram that depicts a high level overview of a system for de-fragmenting a physical memory, according to an embodiment. For simplicity, FIG. 1A only includes a limited number of features, such as three different page-freelists and three applications, but in practice, any number of such features can be included.

FIG. 1A depicts a memory 100 that is depicted as being comprised of a kernel memory 120 and a user memory 130. Note that memory 100 is divided into two portions representing memory for the kernel process and memory for user processes for simplicity, but in practice memory 100 can be a fragmented physical memory, such as that discussed above and illustrated in FIG. 1B.

Kernel memory 120 includes a kernel process 110 and free kernel memory 128. Kernel process 110 includes a de-fragmentation thread 114, a coalescing thread 118, and a hold removal thread 122. For example, kernel process 110 represents a portion of kernel memory 120 devoted to the techniques described herein, such as a thread that de-fragments a physical memory (e.g., de-fragmentation thread 114), a thread for coalescing large pages (e.g., coalescing thread 118), and a thread for removing holes left by the first pass of the de-fragmentation procedure (e.g., hole removal thread). The term "hole" refers to a user page that could not be marked as a relocatable kernel page, as described further herein. Free kernel memory 128 represents the kernel pages that are currently free.

User memory 130 includes three memory portions for three applications, A, B, and C, as represented by application A 132a, application B 132b, and application C 132c, plus free user memory 138 that represents the user pages that are currently free.

FIG. 1A also depicts a user page-freelist 142, a user page-freelist 144, and a kernel page-freelist 146. User page-freelist 142 identifies user pages of the small page size, such as 8K pages, that are currently free. User page-freelist 144 identifies user pages of the large page size, such as 512K pages, that are currently free. Note that while only two different page sizes are depicted in FIG. 1A, any number of different page sizes can be used, and generally a page free list for each page size would be included.

Kernel page-freelist 146 identifies kernel pages that are currently free. Note that in this example of FIG. 1A and elsewhere in the examples herein, kernel pages are only of the standard or small page size and there are no large kernel pages, although the techniques described herein can be applied to larger kernel pages or multiple kernel page sizes. When kernel process 110 requires additional memory, kernel page-freelist 146 is used to identify free kernel pages. Because kernel page-freelist 146 is populated according to the de-fragmentation procedure described herein, additional kernel pages are allocated using free kernel pages that have been segregated based on the large pages. Similarly, when a large user page is coalesced, any kernel pages that are relocated can be relocated to the free kernel pages listed in kernel page-freelist 146, which effectively is the same as moving the kernel pages from the large page being coalesced to a large page that is designated for kernel pages.

Finally, FIG. 1A depicts a disk 180, which may be used for storing the contents of virtual memory that are not included in the physical memory. As another example, if a user page is relocated, the user page can be flushed to disk so that the user page in physical memory is made free, which may be required as part of coalescing a larger user page.

Figure 1B:
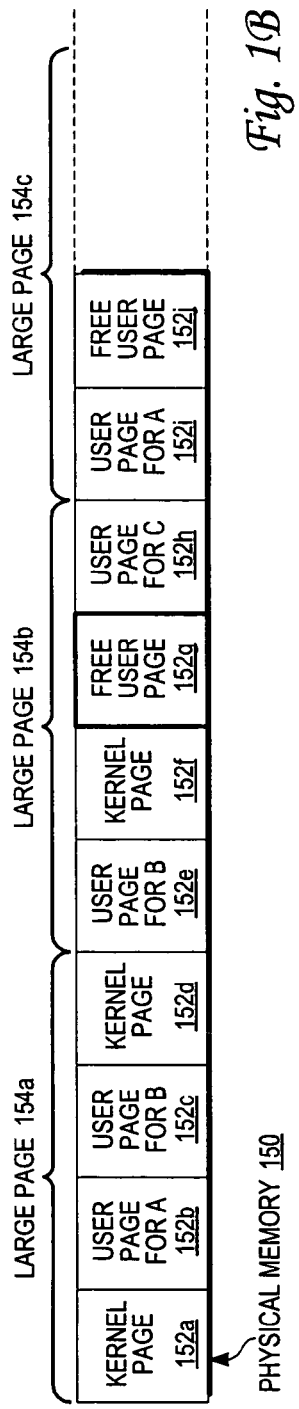
FIG. 1B, FIG. 1C, and FIG. 1D are block diagrams that depict a physical memory that includes user pages, kernel pages, and large pages at different points in the de-fragmentation procedure, according to an embodiment.
Figure 1C:
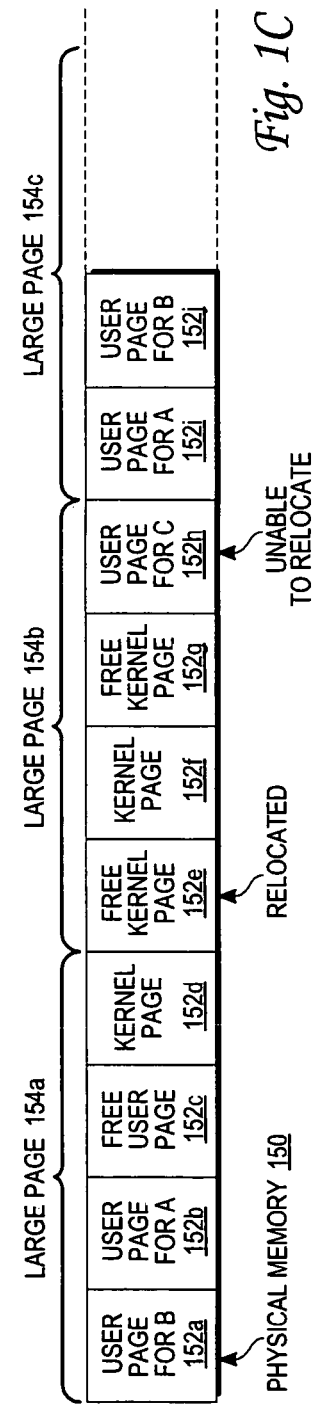
Figure 1D:
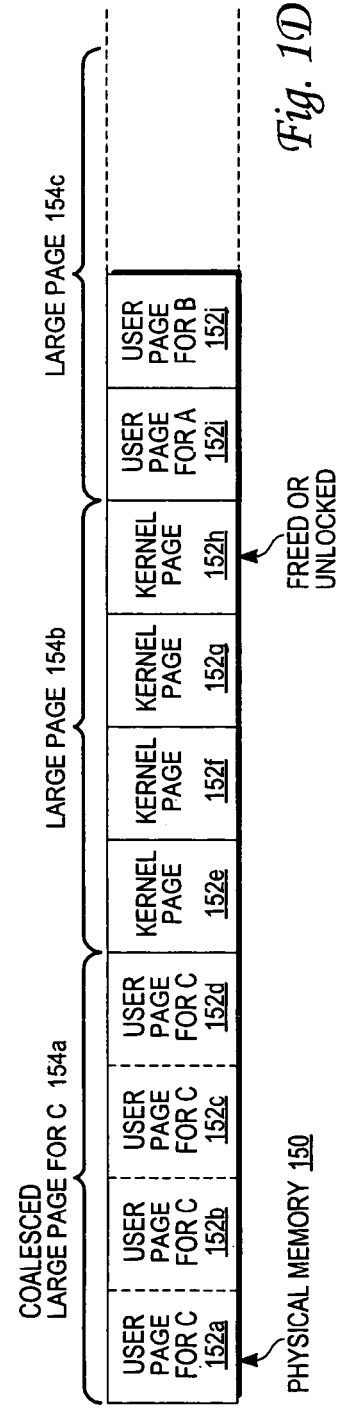

FIG. 1B, FIG. 1C, and FIG. 1D are block diagrams that depict a physical memory 150 that includes user pages, kernel pages, and large pages at different points in the de-fragmentation procedure, according to an embodiment. Physical memory 150 includes pages 152a through 152j. In addition, physical memory 150 includes large pages 154a, 154b, 154c, that correspond to pages 152a-152d, 152e-152h, and 152i-152j plus two more pages not depicted, respectively.

FIG. 1B depicts physical memory 150 prior to applying the de-fragmentation procedure described herein. Specifically, page 152a is being used by kernel process 110 and therefore may be described as a kernel page, page 152b is being used by application A 132a and therefore may be described as a user page, page 152c is a user page for application B 132b, page 152d is a kernel page, page 152e is a user page for application B 132b, page 152f is a kernel page, page 152g is a free user page that would be included in user page-freelist 142, page 152h is a user page for application C 132c, page 152i is a user page for application A 132a, and page 152j is a free user page that would be included in user page-freelist 142. Physical memory 150 also includes many other pages not depicted in FIG. 1B, as represented by the dashed extensions of physical memory 150.

Prior to de-fragmenting physical memory 150, large page 154a includes two kernel pages and two user pages, each for a different application. Thus, large page 154a is fragmented due to the intermixing of user pages and kernel pages. If large page 154a were to be coalesced into a 32K large page, kernel pages 152a, 152d would need to be relocated, plus user pages 152b, 152c would need to be flushed to disk 180. The relocation of kernel pages 152a and 152d could be expensive in a system that allows for relocating kernel pages. In a system in which the kernel pages are not relocatable, then large page 154a could not be coalesced since kernel pages 152a and 152d could not be relocated.

Similarly, large page 154b is fragmented as a result of being comprised of kernel page 152f and user pages 152e, 152g, and 152h for two different applications with one user page being free. Large page 154c is not fragmented based on the two pages depicted, although the two pages not depicted in FIG. 1B may or may not include one or two kernel pages, which would again result in large page 154c being considered to be fragmented.

Finally, in FIG. 1B, page 152g is highlighted by a dark border because page 152g is the starting point for the de-fragmentation procedure described further herein. Specifically, in some implementations, the de-fragmentation procedure starts with the first user page in the user page-freelist, which in FIG. 1B would be free user page 152g (assuming that page 152g were listed first in user page-freelist 142 of FIG. 1A).

FIG. 1C depicts physical memory 150 after the application of the de-fragmentation procedure to large page 154b, according to an embodiment. Specifically, physical memory 150 in FIG. 1C is the same as in FIG. 1B except that page 152e is now depicted as a free kernel page and page 152g is not depicted as a free kernel page. Note that page 152h is still depicted as a user page for application C 132c, which is an example of a "hole" that is left after a first pass of the de-fragmentation procedure, meaning that page 152h could not be designated as a relocatable kernel page, which is described further below. Note that page 152e, which was being used by application B 132b, was relocated, such as by flushing the contents of page 152e to disk 180.

Also, FIG. 1C depicts two changes for the pages for large page 154a as compared to FIG. 1B. Page 152a, which was a kernel page in FIG. 1B, is a user page for application B 132b in FIG. 1C, which may be the result of kernel page 152a in FIG. 1B either being relocated for some reason, or because page 152a was released by the kernel process, following which page 152a was added to user page-freelist 142 and then subsequently allocated to application B 132b. If kernel process 110 later required any additional kernel pages, such pages would be obtained from kernel page-freelist 146, which has been populated with the pages for large page 154b as a result of the de-fragmentation procedure.

Also, page 152c, which was a user page for application B 132b in FIG. 1B, is now a free user page in FIG. 1C, which may be the result of user page 152c being relocated or that page 152c was released by application B 132b.

Finally, FIG. 1D illustrates physical memory 150 after de-fragmentation has successfully segregated kernel pages and user pages such that large page 154b includes only kernel pages and large page 154a includes only user pages. For example, page 154h was eventually capable of being designated as a relocated kernel page, such as by using one of the "hole" removal techniques described below. Large page 154a in FIG. 1D includes only user pages because the pages previously used by the kernel have either been releases or relocated, and now the small pages for large page 152a have been coalesced into a large page for use by application C 132c.

Note that as depicted in FIG. 1D, large pages 154a, 154b, and 154c are "aligned", meaning that each large page starts at a memory address that is a multiple of the large page size. For example, if pages 152a-152j are 8K pages and large pages 154a, 154b, and 154c are 32K pages, then large page 154a starts at address 0, large page 154b at address 32, and large page 154c at address 64. However, if a large page were to begin at address 16 and extend to address 48 (e.g., encompassing pages 152c-152f), then such a large page would not be aligned because the starting address of such a large page does not begin at a multiple of the large page size.

As a result of the segregation of user pages and kernel pages, when application C 132c later needs a 32K large page and the system finds that user page-freelist 144 for 32K pages is empty, large page 154a can be coalesced into a 32K large page and then allocated to application C 132c, which only requires relocating kernel page 152d as part of the coalescing process. Kernel page 152a from FIG. 1B need not be relocated because kernel page 152a was effectively moved from large page 154a to large page 154b (e.g., to page 152g) as a result of the de-fragmentation procedure.

Ideally, when the large pages are aligned and fully de-fragmented, so that each large page only contains either user pages or kernel pages, the coalescing of a large user page would not require the relocating of any kernel pages. However, as depicted by comparing FIG. 1C and FIG. 1D, in practice a particular large page such as large page 154a is not fully de-fragmented, and so some kernel pages may need to be relocated, but the number of kernel pages that require relocating is minimized by the de-fragmentation procedure. For example, page 152a was a kernel page originally in FIG. 1B but effectively was moved from large page 154a to large page 154b as a result of the de-fragmentation procedure, eliminating the need to later relocated kernel page 152a when large page 154a is coalesced.

1.3 Functional Overview

Figure 2:
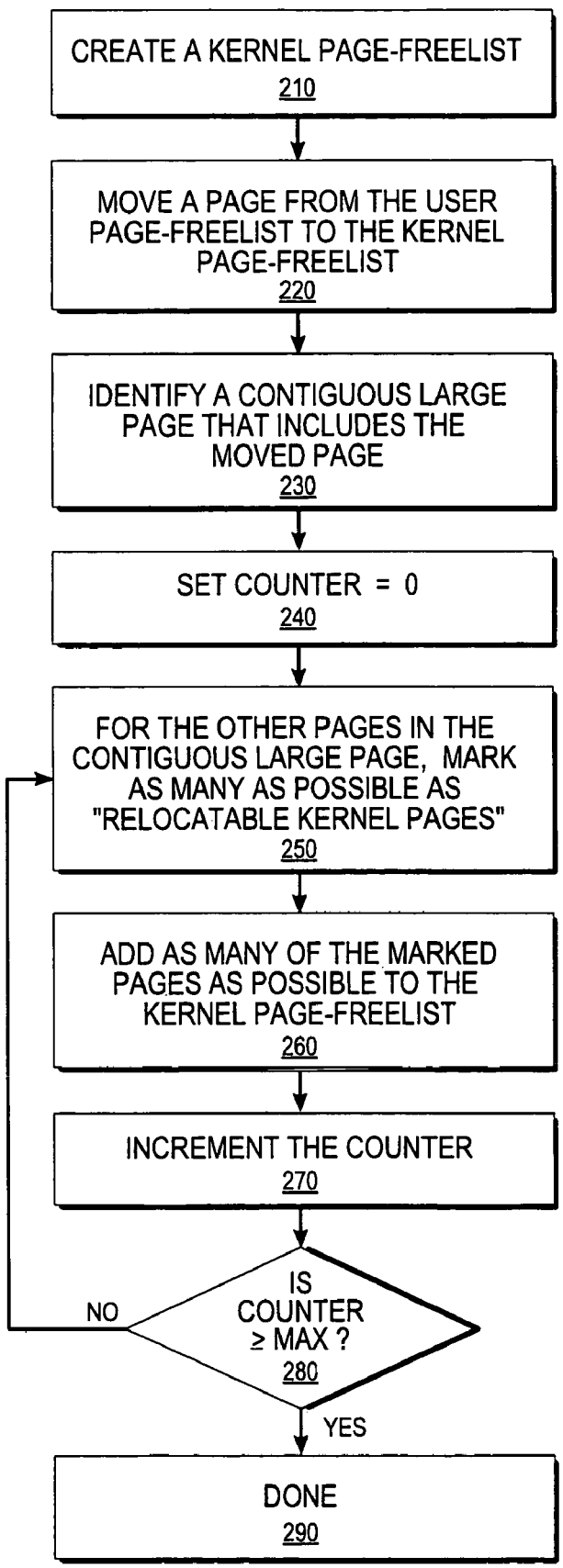
FIG. 2 is a flow diagram that depicts a high level functional overview of an approach for de-fragmenting a physical memory, according to an embodiment.

FIG. 2 is a flow diagram that depicts a high level functional overview of an approach for de-fragmenting a physical memory, according to an embodiment. For purposes of explanation, FIG. 2 is described with reference to FIG. 1A, FIG. 1B, FIG. 1C, and FIG. 1D. However, the approach of FIG. 2 can be applied to any computing system, not just the system depicted in FIG. 1A, FIG. 1B, FIG. 1C, and FIG. 1D. The following functions can be implemented via de-fragmentation thread 114 of FIG. 1A.

In block 210, a kernel page-freelist is created. For example, most computing systems include a page-freelist for each supported page size, but otherwise does not distinguish between free pages on the basis of whether the pages are kernel pages or user pages. Thus, for the de-fragmentation techniques described herein, a kernel page-freelist is created that will be subsequently populated according to the physical memory de-fragmentation techniques described herein, and free kernel pages are identified as belonging on the kernel page-freelist by the setting of the P_KERNEL bit.

In block 220, a page is moved from the user page-freelist to the kernel page-freelist. For example, the first user page listed in user page-freelist 142 can be selected as the page to be moved, such as page 152g in FIG. 1B. Then the selected page can be marked, such as by setting a kernel page flag in the page structure, to indicate that the selected page is a kernel page. Then as a result of setting the kernel page flag, the page is included in kernel page-freelist 146 instead of user page-freelist 142, such as depicted by page 152g in FIG. 1C. Additional details of the moving of the page from user page-freelist 142 to kernel page-freelist 146 are described below with reference to FIG. 3.

In block 230, a contiguous large page that includes the page moved in block 220 is identified. For example, if the moved page is page 152g of FIG. 1B, the contiguous 32K large page is large page 154b.

In block 240, a counter is set equal to zero. The counter is used for counting the number of passes through the large page that the following steps are applied. For example, as noted above, after completion of a single pass through a large page, some pages may not be capable of being marked as kernel pages and then subsequently added to the kernel page-freelist, resulting in one or more "holes." One way to try to remove these holes is by applying the techniques herein again to the pages of the contiguous large page, hopefully resulting in some of the holes being filled in, meaning that the pages were subsequently able to be marked as kernel pages in a later pass through the contiguous large page. Additional techniques for filling holes that can be used in place of or in conjunction with the multiple pass approach are described below.

In block 250, the other pages in the contiguous large page are processed and as many as possible are marked as "relocatable kernel pages." For example, the process can start with the first user page in the contiguous large page, such as page 152e, and work through each user page in order. If possible, each page is marked as a relocatable kernel page, such as by setting the P_KERNEL bit. Note that depending on the ability to obtain an exclusive lock for the user page and/or a shared lock on the user page, plus whether the user page is either free or mapped, will determine whether the P_KERNEL bit can be set, as described more fully below with respect to FIG. 4.

In block 260, as many of the marked pages as possible are added to the kernel page-freelist. For example, some user pages may be able to be marked as relocatable kernel pages, but because those user pages are in use, cannot be added to the kernel page-freelist. However, by setting the P_KERNEL bit, when those pages are subsequently freed, they are added to kernel page-freelist 146 instead of user page-freelist 142. Other pages, however, are capable of being added immediately to kernel page-freelist 146, such as when an exclusive lock can be obtained. The discussion below with reference to FIG. 4 details when a user page can be added to the kernel page-freelist immediately or can just be marked to then later be added to the kernel page-freelist when subsequently freed.

In block 270, the counter is incremented. For example, block 270 is reached after processing each user page in large page 154b.

In block 280, the counter is compared to a specified maximum value, and if the maximum is met or exceeded, the process is done, as depicted by block 290. However, if the counter is less than the specified maximum, the process returns to block 250, where another pass through the user pages of the large page is begun to attempt to mark and add any user pages that previously could not be marked or added in blocks 250 and 260 in a previous pass (e.g., removing any holes from the previous pass through the contiguous set of user pages corresponding to the large page).

After completion of the approach depicted in FIG. 2, most and possibly all the pages in the contiguous large page have at least been marked as relocatable kernel pages and most of those marked pages will have been or will be added to the kernel page-freelist. Then as kernel pages are allocated, the free kernel pages from the kernel page-freelist are used. Note that as kernel pages are released in other large pages that have not been de-fragmented and therefore the P_KERNEL bit is not set, the pages previously used by the kernel are listed in the user page-freelist when the pages are freed. By populating the kernel page-freelist, kernel pages are effectively collected within a number of large pages, leaving only user pages in the other large pages, and as a result, when a large user page is coalesced, few if any kernel pages need to be relocated.

2.0 Initiating De-Fragmentation of Physical Memory

2.1 Designating Pages as a Kernel Pages and User Pages

According to an embodiment, pages are designated as either kernel pages or user pages. For example, in the page structure for the pages, a flag can be used to distinguish between kernel pages and user pages. As a specific example, the page structure can include a P_KERNEL bit with possible values of "0" or "1." When the bit is set (e.g., the bit is "1"), the page is designated as a kernel page, whereas if the bit is not set (e.g., the bit is "0"), the page is designated as a user page. The use of a flag for designating a page as a kernel page is an example of marking the page as a kernel page.

Depending on whether a page is designated as a kernel page or a user page, the system can be configured to only use kernel pages for the kernel process and to only use user pages for user processes. As another example, the system can be configured to use kernel pages from the kernel page-freelist first, and only when no free kernel pages are left, to use free user pages from the user page-freelist.

A default value can be used for the marking of pages, such as having the P_KERNEL bit initially equal to "0" for all pages. When the computing system initially boots, all pages in the physical memory are considered to be user pages and are listed in the user page-freelist. As pages are allocated to the kernel process, since the kernel page-freelist is empty, free pages are taken from the user page-freelist. Later, as a result of the de-fragmentation procedure, some pages have the P_KERNEL set to "1" to designate those pages as kernel pages, and therefore are listed in the kernel page-freelist. Then when the kernel process requires a page, the kernel page-freelist is used to obtain free kernel pages, unless the kernel page-freelist is empty, in which case pages can be taken from the user page-freelist.

Depending on the implementation, changing the P_KERNEL bit from "1" back to "0" may or may not be supported. For example, if there is no concern over having too many pages designated as kernel pages, no provision for changing the P_KERNEL bit back to "0" need be included. However, in other implementations, such as those in which the de-fragmentation procedure is used to work through a large page and designate the constituent pages as user pages (e.g., the reverse of most of the examples described herein in which pages within a large page are designated as kernel pages), support can be included for changing the P_KERNEL bit from "1" to "0."

Note that in some implementations, upon startup of the system, pages are allocated to the kernel process and to one or more user processes. However, all of such pages that are initially allocated have the P_KERNEL bit left unset (e.g., equal to "0"), even though some pages are allocated to the kernel process. In such an implementation, the P_KERNEL bit is set during de-fragmentation, which occurs later following initial startup. Yet pages allocated to the kernel process may be referred to as kernel pages, even though the P_KERNEL bit is not set. Thus, even following start-up, if pages are allocated to the kernel process, such pages do not have the P_KERNEL bit set to designate that the pages are kernel pages.

In other implementations, any pages allocated to the kernel process during startup or at a later time are marked as kernel pages. For example, when a page is allocated to the kernel process, the P_KERNEL bit is set to "1." In yet other implementations, the P_KERNEL bit can left unset when pages are allocated to the kernel process at startup, yet when pages are allocated to the kernel at a later time, the pages are marked by setting the P_KERNEL bit.

2.2 Creating a Kernel Page-Freelist

Traditional computing systems generally organize free pages according to size, and thus for each supported page size, there is a corresponding page-freelist. However, traditional computing systems do not distinguish between user pages and kernel pages, and therefore the page-freelist for the smallest page size is used to obtain free pages for both user processes and the kernel process when a page is needed.

According to one embodiment, a kernel page-freelist is created. For example, instead of a single 8K page-freelist that is used to provide free pages for use by the user processes and the kernel process, separate 8K page-freelists are used, one for free 8K user pages and one for free 8K kernel pages. The different page-freelists are established by the boot code for the system when the system initially boots up.

When a page is freed, the P_KERNEL bit is checked to determine whether the bit is set (e.g., designating the page as a kernel page) or not set (e.g., designating the page as a user page). If the P_KERNEL bit is set, the freed page is included in the kernel page-freelist, whereas if the P_KERNEL bit is not set, the freed page is included in the user page-freelist.

In most implementation, only one kernel page-freelist is created and used, since the kernel typically does not require large pages and as a result, the kernel page-freelist identifies all 8K pages that are free and designated as kernel pages. However, in other implementations, if different sizes of kernel pages are used, separate kernel page-freelists for each size can be created and used, just as different user page-freelists are used for different sized user pages.

2.3 Triggers for Starting De-Fragmentation

The de-fragmentation procedure can be started based on one or more triggering events. For example, the de-fragmentation procedure can be started when the kernel page-freelist is empty or when the kernel page-freelist identifies fewer than a specified number of free kernel pages. Either the system can monitor the status of the kernel page-freelist as periodic intervals, or the determination of whether the kernel page-freelist is empty or has fewer than the specified number of free kernel pages can be made as part of trying to fulfill a request for a kernel page.

As a specific example, when a free kernel page is needed, the kernel page-freelist is used to identify a free kernel page, and after removing that free kernel page from the kernel page-freelist, a check is made of the number of free kernel pages remaining on the kernel page-freelist. If there are no kernel pages remaining, or the number of remaining free kernel pages is less than a specified number, then de-fragmentation thread 112 can be wakened or started to populate the kernel page-freelist.

Typically the system has a number of parameters for tracking how much memory is free, such as by using variables such as "lotsfree," "desfree," "minfree," "throttlefree," and "pageout_reserve" in the SPARC architecture. For example, "lotsfree" can be set to 1/64, meaning that one page out of every 64 pages should be free. "Desfree" can then be set to ½ of "lotsfree," "minfree" to ½ of "desfree" or ¼ of "lotsfree," "throttlefree" to ½ of "minfree," and "pageout_eserver" to 20 pages. If the free memory (e.g., as determined by the "freemem" thread) of the system falls below the value of one of these memory variables, the system can be configured to taken action to make more memory available.

Additional parameters can be set by the "freemem" thread for the "pageout" daemon when making more memory available, such as a "ticks" parameter to specify how many CPU ticks are to be used by the "pageout" daemon and "nscan" to specify how many pages should be scanned.

In a system that marks kernel pages and distinguishes the kernel pages from the user pages, the above variables can be used to track user pages only, while similar variables can be used to track free kernel pages only (e.g., "kernel_lotsfree," "kernel_desfree," "kernel_minfree,""kernel_throttlefree," and "kernel_pageout_reserve"). Similar or different values for the kernel memory variables can be used as described above.

If the de-fragmentation thread is started or awoken, the "freemem" process can allocate the number of CPU ticks (e.g., via a "k_ticks" parameter) to be used by the de-fragmentation thread, as well as the number of large pages to be scanned (e.g., via a "k_nscan" parameter).

While the several specific triggers are described herein, in general, any suitable triggering mechanism can be used to initiate the process of de-fragmenting the physical memory by segregating kernel pages and user pages, and the techniques described herein are not limited to the triggers described herein.

2.4 Selecting a Large Page to Process

Once the de-fragmentation procedure is begun, a large page is selected so that the contiguous pages for the large page can be processed resulting in many of the constituent pages being designated as kernel pages and then added to the kernel page-freelist. According to one embodiment, the large page to be processed is selected by picking the first page listed in the user page-freelist and identifying which large page includes that selected page. For example, if page 152g in FIG. 1B is the first page listed in user page-freelist 142, the corresponding large page is large page 154b.

Once a large page is identified, the first page within the large page can be determined, and then the de-fragmentation procedure works through each page within the large page in order. For example, if the system includes 512K large pages, and the address or pfn of the first page listed in the user page-freelist is 784, the pfn of the first page in the corresponding large page is found by taking the address of the free user page (e.g., 784), dividing by the size of the large page (e.g., 784/512=1.53125), discarding the remainder (e.g., 0.53125, leaving 1, which is also the pfn of the 512K large page), and then multiplying by the page size (e.g., 512*1=512). The de-fragmentation procedure then starts with the page at pfn 512, and then works through the remaining pages in order (e.g., the page at pfn 513, then the page at pfn 514, etc.) until all 512 pages within this large page (e.g., through the last page at pfn 1023) is reached.

Other approaches for selecting the large page to process can also be used. For example, instead of selecting the first page listed in the user page-freelist, the last page in the user page-freelist can be selected, or a page can be selected at random from the user page-freelist. As another example, instead of using a free user page from the user page-freelist to identify a large page, the large page can be selected directly, such as by choosing the first large page, the last large page, or a randomly selected large page. In general, any suitable approach for selecting a large page to process with the de-fragmentation thread can be used, and the techniques described herein are not limited to the particular examples of selecting a large page that are described above.

2.5 Adding the First Page to the Kernel Page-Freelist

Figure 3:
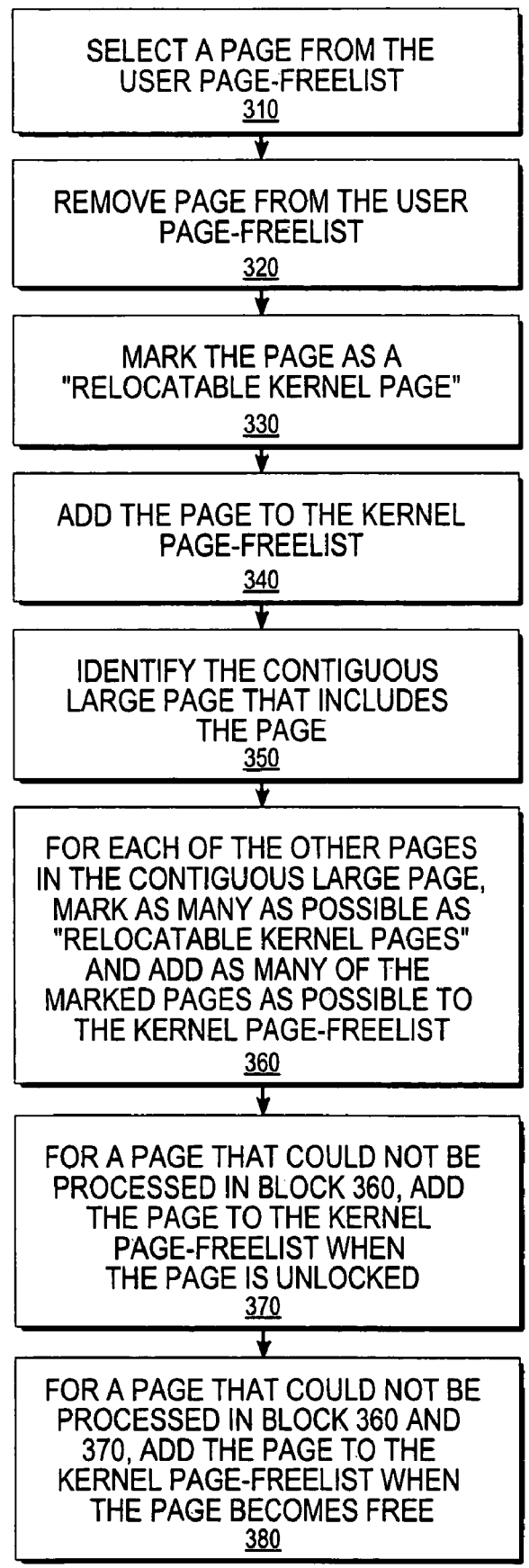
FIG. 3 is a flow diagram that depicts an approach for de-fragmenting a physical memory by grouping kernel pages together based on large pages, according to an embodiment.

FIG. 3 is a flow diagram that depicts an approach for de-fragmenting a physical memory by grouping kernel pages together based on large pages, according to an embodiment. FIG. 3 is described with reference to FIG. 1A, FIG. 1B, FIG. 1C, and FIG. 1D. However, the approach of FIG. 3 can be applied to any computing system, not just the system depicted in FIG. 1A, FIG. 1B, FIG. 1C, and FIG. 1D. The following functions can be implemented via de-fragmentation thread 114 of FIG. 1A.

In block 310, a page from the user page-free list is selected. For example, as discussed above, the first page listed in user page-freelist 142, such as free user page 152g, can be selected. Selection of page 152g can involve attempting to obtain an exclusive lock on user page-freelist 142.

In block 320, the page is removed from the user page-freelist. For example, successfully obtaining an exclusive lock on free user page 152g would remove user page 152g from user page-freelist 142.

In block 330, the page is marked as a "relocatable kernel page." For example, in the page structure for user page 152g, the P_KERNEL bit that was originally "0", thereby indicating that the page 152g is not a relocatable kernel page but rather is a user page, is set to "1", thereby indicating that page 152g is now a relocatable kernel page. Note that in this example, page 152g is specified to be a relocatable kernel page, which means that the computing system supports relocation of kernel pages. However, if in other implementations the computing system does not support relocating kernel pages, setting the P_KERNEL bit to "1" would indicate that the page is a kernel page, but not that the kernel page is relocatable.

In block 340, the page is added to the kernel page-freelist. For example, the lock on kernel page 152g can be dropped, and because the P_KERNEL bit is set to "1," page 152g is added to kernel page-freelist 146 instead of user page-freelist 142.

In block 350, the contiguous large page that includes the page is identified. Identification of the large page can be based on the pfn of the page added to the kernel page-freelist, such as by storing the pfn of the page in a local variable before releasing the lock on the page. For example, in block 340, a local variable can store the pfn of page 152g as 6, and then the large page is identifies as large page 154b as discussed above with respect to block 230.

In block 360, for each of the other pages in the contiguous large page, as many pages as possible are marked as "relocatable kernel pages" and then as many as possible are added to the kernel page-freelist. For example, the functions of block 360 can correspond to the functions described above with respect to block 250 and 260. As another example, the functions of block 360 can correspond to the functions described below with respect to FIG. 4. Recall from the discussion of FIG. 2 above, "holes" in the large page can be left after a pass through the large page, in which each "hole" represents a page that could not be marked as a relocatable kernel page.

In block 370, for a page that could not be marked as a relocatable kernel page in block 360 (e.g., a "hole"), an attempt to mark the page as a relocatable kernel page is made when the page is unlocked. For example, after the de-fragmentation procedure is performed one or more times on the pages in the large page (e.g., as discussed above with respect to FIG. 2 in which the counters track the number of passes through the large page), some holes may remain, such as for pages that are being used and therefore the necessary locks to mark the pages as relocatable kernel pages could not be obtained. However, when such a page is unlocked, although the page may still not be free, an attempt can then be made by hole removal thread 122 to obtain the necessary locks to at least mark the page as a relocatable kernel page. This additional technique for removing holes is described further below in Section 5.2.

In block 380, for a page that could not be processed in blocks 360 and 370, the page is added to the kernel page-freelist when the page becomes free. For example, after the de-fragmentation procedure is performed one or more times on the pages in the large page (e.g., as discussed above with respect to FIG. 2 in which the counters track the number of passes through the large page), and even after applying the technique of block 370, some holes may remain. However, when such a page is eventually freed by the process using the page, a check can be made by hole removal thread 122 as to whether the large page to which the now freed page belongs has been processed by de-fragmentation thread 114. If so, then the page can now be marked as a relocatable kernel page and then added to the kernel page-freelist. This additional technique for removing holes is described further below in Section 5.3.

Note that although FIG. 3 does not depict the use of multiple passes through the large page to remove the holes, such an approach can be incorporated into block 360. Similarly, the techniques for removing holes in blocks 370 and 380 need not be used, or only one can be used but not the other. In general, any of the hold removal techniques as described herein may be used, either alone or in combination with one or more of the other techniques or even with additional techniques not described herein.

3.0 Populating a Kernel Page-Freelist

Figure 4:
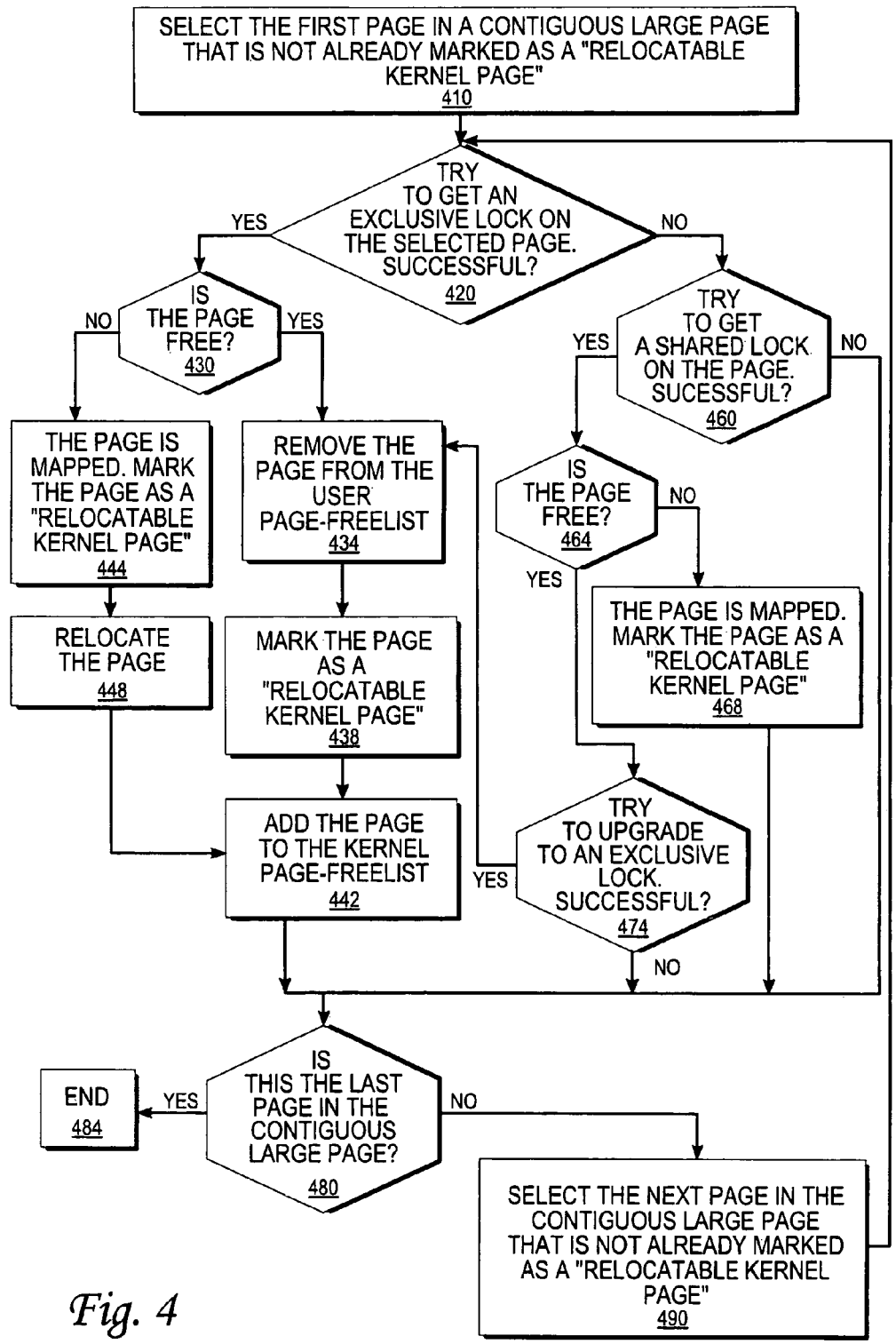
FIG. 4 is a flow diagram that depicts an approach for populating a kernel page-freelist, according to an embodiment.

FIG. 4 is a flow diagram that depicts an approach for populating a kernel page-freelist, according to an embodiment. FIG. 4 is described with reference to FIG. 1A, FIG. 1B, FIG. 1C, and FIG. 1D. However, the approach of FIG. 4 can be applied to any computing system, not just the system depicted in FIG. 1A, FIG. 1B, FIG. 1C, and FIG. 1D. The following functions can be implemented via de-fragmentation thread 114 of FIG. 1A.

The functions depicted in FIG. 4 can be used to implement block 360 of FIG. 3 and blocks 250 and 260 of FIG. 2. Note that any of the other functions of FIG. 2 and FIG. 3 can be used with the approach of FIG. 4, although such functions are omitted for clarity in explaining the technique depicted in FIG. 4 for populating a kernel page-freelist.

In block 410, the first page in a contiguous large page that is not already marked as a "relocatable kernel page" is selected. For example, page 152e of FIG. 1B, which is the first page of large page 154b, can be selected, such as when page 152g has already been moved from user page-freelist 142 to kernel page-freelist 146 as discussed above with reference to FIG. 3.

In block 420, an attempt to obtain an exclusive lock on the selected page is made. If successful, the process continues to block 430, which is discussed below in Section 3.1, But if the exclusive lock cannot be obtained, the process continues to block 460, which is discussed below in Section 3.2. For example, if the exclusive lock can be obtained on page 152e, then no other process has a lock on page 152e, which allows page 152e to be added to kernel page-freelist 146, as described below in Section 3.1 However, if the exclusive lock cannot be obtained on page 152e, such as when another process has the exclusive lock or a shared lock on page 152e, then page 152e may not be capable of being added to kernel page-freelist 146, as described below in Section 3.2.

3.1 Exclusive Lock Can Be Obtained for a User Page

If the exclusive lock was obtained in block 420, then in block 430 a determination is made whether the page is free. If the page is free, the process continues to blocks 434, 438, and 442, and if not, the process continues to blocks 444, 448, and 442.

In block 434, which is reached if both the exclusive lock is obtained on the selected page and the page is free, the page is removed from the user page-freelist. For example, if the exclusive lock on page 152e is obtained and page 152e is free, then obtaining the exclusive lock on page 152e removes page 152e from user page-freelist 142.

From block 434, the process continues to block 438, where the page is marked as a "relocatable kernel page." For example, page 152e can have the P_KERNEL bit set to "1," as with page 152g discussed above with reference to block 330.

From block 438, the process continues to block 442, where the page is added to the kernel page-freelist. For example, the lock on page 152e can be dropped, and because the P_KERNEL bit is set to indicate that the page is a kernel page, page 152e is added to kernel page-freelist 146, as with page 152g discussed above with reference to block 340. From block 442, the process continues to block 480, which is discussed below in Section 3.3.

Returning to block 444, which is reached if the exclusive lock can be obtained but the page is not free, the page is determined to be mapped, meaning that the page is in use. In this case, the page is marked as a "relocatable kernel page," as described above in block 438. There is no need to remove the page from the user page-freelist since the mapped page is not free and therefore is not included in the user page-freelist.

From block 444, the process continues to block 448, where the page is relocated. For example, if the exclusive lock can be obtained for page 152e, but page 152e is mapped instead of being free, then the contents of page 152e are relocated to free up page 152e. For example, the contents of page 152e can be flushed to disk 180.

From block 448, the process continues to block 442, where the page is added to the kernel page-freelist. For example, once the contents of page 152e are relocated, the lock on page 152e is dropped, and because the P_KERNEL bit is set to "1" to designate page 152e as a kernel page, page 152e is added to kernel page-freelist 146. From block 442, the process continues to block 480, which is discussed below in Section 3.3.

3.2 Exclusive Lock Cannot Be Obtained for a User Page

If the exclusive lock was not obtained in block 420, then in block 460 an attempt is made to get a shared lock on the page. If successful, the process continues to block 464, as discussed below.

If the shared lock cannot be obtained in block 460, the process continues to block 480, which is discussed below in Section 3.3. In this situation, neither the exclusive lock nor a shared lock can be obtained on the selected page, which means that nothing can be done in terms of marking the page as a relocatable kernel page or adding the page to the kernel page-freelist. Thus, such a page is an example of a "hole" referred to above, for which one or more of the hole removal techniques can be used to eventually get the page added to the kernel page-freelist.

In block 464, which is reached when the shared lock is obtained, a determination is made whether the page is free. If the page is free, the process continues to block 474 as discussed below, and if not, the process continues to block 468.

In block 468, the page is not free, so that means that the page is mapped. The page is then marked as a "relocatable kernel page," and the process continues to block 480, which is discussed below in Section 3.3. In this situation, the page is in use and therefore cannot be added to the kernel page-freelist. However, at some later time when the page is no longer in use and is freed, the page is then added to the kernel page-freelist because the P_KERNEL bit is set, thereby indicating that the page is a kernel page.

In block 474, which is reached when the shared lock can be obtained on the page and the page is free, an attempt is made to upgrade the lock to an exclusive lock. If successful, the process continues to block 434, which is described above. In this situation, although an exclusive lock on the page could not be initially obtained in block 420, the exclusive lock can now be obtained and the page is processed as described above with respect to blocks 434, 438, and 442.

If in block 474 the shared lock cannot be upgraded to an exclusive lock, the process continues to block 480,which is discussed below in Section 3.3. In this situation, with only a shared lock on the free page, the page cannot even be marked as a relocatable kernel page, and as a result, the page is a "hole."

3.3 Processing Additional Pages in the Large Page

Once a page is processed according to Sections 3.1 and 3.2 above, the process continues to block 480, where a determination is made whether the page just processed is the last page in the contiguous large page. If so, the process continues to block 484, which is the end of the de-fragmentation pass for the large page. Although not shown in FIG. 4, additional passes over the same large page can be used in order to remove any "holes," such as by starting a subsequent pass at the first hole and returning to block 420.

If in block 480 the page is determined to not be the last page in the contiguous large page, the process continues to block 490.

In block 490, the next page in the contiguous large page that is not marked as a "relocatable kernel page" is selected. For example, if page 152e has been processed as described above, de-fragmentation thread 114 moves on to the next page in large page 154b, which is page 152f. However, as indicated in FIG. 1D, page 152f is a kernel page, and therefore has already been marked by setting the P_KERNEL bit. As a result, de-fragmentation thread 114 moves to the next page, which is 152g that was previously processed as well. Thus, de-fragmentation thread 114 moves to the next page, which is page 152h, which is a user page being used by application C 132c. Thus, page 152h is selected in block 490.

From block 490, the process returns to block 420, where the page selected in block 490 is processed as described above. For example, page 152h would be processed just as page 152e was above. When the process reaches block 480, since page 152h is the last page in large page 154b, the process would end in block 484.

4.0 Coaliscing a Large Page

In the techniques described above, user pages and kernel pages are segregated based on large page chunks. For example, as depicted in FIG. 1D, after de-fragmenting physical memory 150, large page 154a includes only user pages while large page 154b includes only kernel pages. However, the de-fragmentation procedure leaves the individual pages for each large page as separate pages. The large pages are only treated as a single page of the large size when the small, individual pages are coalesced into the large page. The de-fragmentation procedure increases the likelihood that large pages can be coalesced in systems with kernel pages that cannot be relocated, and that the coalescing process will involve relocating fewer kernel pages in systems in which kernel pages can be relocated.

Figure 5:
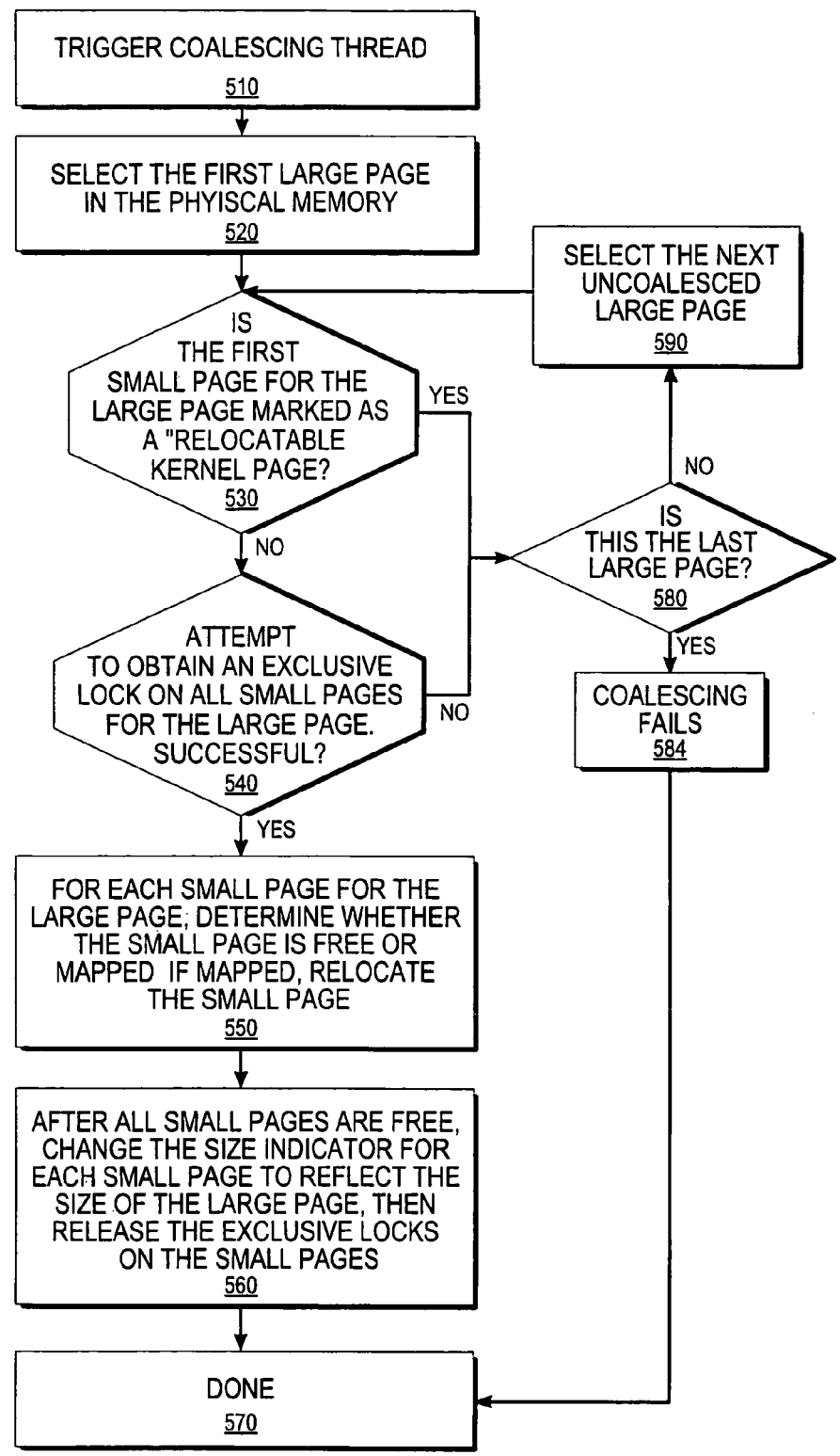
FIG. 5 is a flow diagram for coalescing a large page in a physical memory that includes relocatable kernel pages, according to an embodiment.

FIG. 5 is a flow diagram for coalescing a large page in a physical memory that includes relocatable kernel pages, according to an embodiment. FIG. 5 is described with reference to FIG. 1A, FIG. 1B, FIG. 1C, and FIG. 1D. However, the approach of FIG. 5 can be applied to any computing system, not just the system depicted in FIG. 1A, FIG. 1B, FIG. 1C, and FIG. 1D. The following functions can be implemented via de-fragmentation thread 114 of FIG. 1A.

In block 510, the coalescing thread is triggered. For example, if application B 132b requires a large page, yet user page-freelist 144 is empty, coalescing thread 118 can be started or awakened. However, other events may the coalescing process. For example, even if user page-freelist 144 is not empty, but the number of large pages included is less than a specified number, then coalescing thread 118 can be triggered. When the thread for application B 132b finds that there are no large pages available (e.g., user page-freelist 144 is empty), the thread for application B 132b is blocked and goes to sleep. The blocked thread will be awakened later after a large page is coalesced.

In block 520, the first large page in the physical memory is selected. For example, large page 154a in FIG. 1C is selected. However, other approaches for selecting the large page to process first can be used, such as selecting the last large page or randomly selecting a large page.

In block 530, a determination is made whether the first small page for the large page is marked as a "relocatable kernel page." For example, the first small page for large page 154a is page 152a, and as indicated in FIG. 1C, page 152a is a user page because the P_KERNEL bit is "0" to denote that page 152a is not a relocatable kernel page. As another example, if the large page were large page 154b, then the first small page is 152e, which is depicted in FIG. 1C as a kernel page because the P_KERNEL bit is "1."

By checking the first small page of the large page, coalescing thread 118 can determine whether the large page has been populated by kernel pages as part of the de-fragmentation procedure. However, other approaches can be used for determining whether a large page has been populated by the de-fragmentation procedure, such as checking several of the small pages and determining whether the majority of those small pages are kernel pages. This can be useful for large pages in which the first small page is a hole and as a result, would pass the check depicted by block 530.

If the first small page for the large page is a relocatable kernel page, the process continues to block 580, which is discussed below. However, if the first small page is not marked as a relocated kernel page, the process continues to block 540.

In block 540, an attempt is made to obtain an exclusive lock on all the small pages for the large page. For example, coalescing thread 118 can attempt to obtain the exclusive lock on pages 152a, 152b, 152c, and 152d for large page 154a.

If the exclusive lock cannot be obtained on all the small pages, the processing continues to block 580, which is discussed below. However, if the exclusive lock can be obtained for all the small pages, the process continues to block 550.

In block 550, for each small page for the large page, a determination is made whether the small page is free or mapped, and if mapped, the small page is relocated. For example, in FIG. 1C, page 152a is mapped because application B 132b is using user page 152a and page 152b is also mapped because application A 132a is using user page 152b. Therefore, pages 152a and 152b are relocated, such as by flushing them to disk 180. Page 152c is free and thus is included in user page-freelist 142. Finally, page 152d is mapped and is also a kernel page, which needs to be relocated as well, such as to free kernel page 152e.

In block 560, after all the small pages are free, the size indicator for each small page is changed to reflect the size of the large page, and then the exclusive locks on the small pages are released. For example, the page structure for pages 152a-152d includes a "size" flag or bit, such as that a "0" indicates an 8K size whereas a "1" indicates a 32K size. Initially, the size bit for pages 152a-152d is set to "0," but now the size bit is changed to "1" to reflect the 32K size of coalesced large page 154a, as depicted in FIG. 1D. The process then continues to block 570, which is the end of the coalescing process.

Once the large page, such as large page 154a, is coalesced, the large page is added to the page-freelist for the new size, such as user page-freelist 144 for large pages. The process that triggered the coalescing procedure, such as by finding user page-freelist 144 empty, is awakened so that user page-freelist 144 can be checked again. This time the newly coalesced large page is found and then allocated to the requesting user application, such as by allocating coalesced large page 154a to application C 132c.

Returning to block 580, recall that this block is reached when either the first small page the large page is marked as a relocated kernel page or the exclusive lock cannot be obtained all of the small pages for the large page. In block 580, a determination is made whether the large page that was being checked is the last large page in the physical memory. If so, the process continues to block 584, which represents that the coalescing process has failed. From block 584, the process goes to block 570, which represents the end of the processing by the coalescing thread.

If in block 580 the large page is determined to not be the last large page in the physical memory, the process continues to block 590, where the next uncoalesced large page is selected, and then the process returns to block 530 to process the next selected large page. For example, if the coalescing of large page 154*a* had failed, then large page 154*b* would be selected. However, coalescing of large page 154*b* would fail in block 530, because the first small page, page 152*e*, is marked as a relocatable kernel page. In that case, the process would return to block 580 and then to block 590, where large page 154*c* would be selected, and so on. Eventually either a large page would be coalesced or the last large page would be processed without a large page being coalesced, in which case the requesting user application would have to make do with smaller pages.

Note that after the large page is coalesced, the new large page is free and will be added to the appropriate large page-freelist, such as user page-freelist 144. The thread that originally requested the large page but found none and was blocked and put to sleep is then awakened. Then the awakened thread can check the large page-freelist again, find the new large page, and then use the new large page.

5.0 Removing "Holes" After a First Pass Over a Large Page

As discussed above, the de-fragmentation procedure may not be able to mark every user page within a large page as a relocatable kernel page, and as a result, one or more "holes" may be left within the large page. For example, in FIG. 1C, page 152*h* remains a user page after de-fragmentation because the necessary locks to set the P_KERNEL bit to indicate the page is a kernel page could not be obtained, such as because application C 132*c* was using page 152*h* when the de-fragmentation procedure attempted to process page 152*h*, When such holes occur, one or more of the following techniques can be applied to eliminate some or all of the holes, although other techniques not described herein may also be used. Note that any of the techniques described below can be used in combination with one or more of the other techniques, depending on the implementation and preferences of the system administrator.

5.1 Multiple Passes Over a Large Page

In one implementation, multiples passes using the de-fragmentation procedure are performed over a large page. For example, as depicted in FIG. 2, a counter of the number of times the small pages within a large page are processed can be tracked, so that a specified number of passes through the large page are performed. As a specific example, de-fragmentation thread 114 works through the pages 152*e*-152*h* of large page 154*b* three times. The specified number of passes through a large page can be specified to be any value, with the user determining selecting a particular number based on weighing the value of eliminating holes with the additional processing required for making the multiple passes through the large page.

To implement the multiple pass technique for removing holes, the pfn of the first hole from the previous pass can be tracked. For example, before making the first pass through the large page, a local "pending" variable can be set to "0," and then during the first pass, the pfn of the first page that could not be processed (e.g., the first hole) is stored in the pending variable. As a result, the second pass need not start at the first small page of the large page, but rather can start at the first hole by using the pfn value stored in the "pending" variable. Then during the second and subsequent passes, the value of the pending variable can be updated with the pfn of the first hole encountered for the particular pass. By storing the pfn of the first hole from each pass, the subsequent pass can skip processing pages that have already been marked as kernel pages.

In other implementations, other techniques for minimizing the processing during subsequent passes can be employed. For example, instead of storing the pfn of the first hole, a set of variables can be used to list the pfn of each hole from a previous pass through the large page, such that subsequent passes only look at the small pages that are identified as holes. This technique can avoid having to look at kernel pages following the first hole within the large page, but at the expense of having to store and track numerous pfn's instead of a single pfn as in the first hole technique above.

5.2 Removing a Hole When a User Page is Unlocked

In one implementation, when a page is unlocked, a check is made to determine if the page is a hole, and if so, the page is processed to try to mark the page as a kernel page. For example, whenever a page is unlocked, hole removal thread 122 can be started or awakened, and then hole removal thread 122 checks the starting pfn of the large page to which the unlocked page belongs. Then hole removal thread 122 compares the P_KERNEL bit of the first small page to the P_KERNEL bit of the unlocked page. If the P_KERNEL bits are the same (e.g., either both are set, thereby indicating that both are kernel pages, or both are not set, thereby indicating that both are user pages), nothing is done and hole removal thread 122 goes back to sleep.

However, if the P_KERNEL bits are not the same between the unlocked page and the first small page within the large page, then the P_KERNEL bit on the unlocked page is changed, such as by obtaining the exclusive lock on the page to be changed and then setting the P_KERNEL bit to "1." Note that this technique can be applied to the release of any lock, such as shared locks and exclusive locks, the release of a particular type of lock (e.g., exclusive locks only), or to the release of some types of locks but not all types of locks.

As a specific example, if page 152*f* in FIG. 1C is unlocked, the P_KERNEL bit for page 152*f* (which is set to "1" because page 152*f* is depicted as a kernel page in FIG. 1C) is compared to the P_KERNEL bit for the first page within large page 154*b*, which is page 152*e* (for which the P_KERNEL bit is also set to "1"). Because the P_KERNEL bit is set for both pages 152*f* and 152*e*, nothing is changed, which reflects that page 152*f* is not a hole within large page 154*b* that has been processed according to the de-fragmentation procedure. Similarly, if page 152*b* in FIG. 1C is unlocked, the P_KERNEL bit for page 152*b* (e.g., "0" since page 152*b* is depicted as a user page) is compared to the P_KERNEL bit for page 152*a* (e.g., the first page of large page 154*a*, for which the P_KERNEL bit is also set to "0"). Because the P_KERNEL bit is not set for both pages 152*b* and 152*a*, nothing is changed, which reflects that large page 154*a* has not been processed according to the de-fragmentation procedure, as indicated by page 152*a* still being a user page instead of a kernel page.

However, if page 152*h* is unlocked, the P_KERNEL bit for page 152*h* (which is "0" because page 152*h* is depicted as a user page in FIG. 1C), is compared to the P_KERNEL bit for the first page within large page 154*b*, which is page 152*e* (for which the P_KERNEL bit is also set to "1"). Because the P_KERNEL bit is set for page 152*e* but not for page 152*h*, at attempt is made to set the P_KERNEL bit for page 152*h*, thereby changing the value "0" to "1" to indicated that page 152*h* is a kernel page, as depicted in FIG. 1D.

In this situation, page 152*h* was a hole after the de-fragmentation procedure was performed, perhaps due to page 152*h* being used by application C 132*c* thereby preventing de-fragmentation thread 114 from obtaining the necessary locks to set the P_KERNEL bit. Now that page 152*h* is unlocked, hole removal thread 122 can attempt to obtain the necessary locks, as described above with respect to FIG. 4, and as a result, hole removal thread 122 may be able to mark page 152*h* as a relocatable kernel thread.

Whether or not hole removal thread 122 can successfully mark the unlocked page as a relocatable kernel page depends on whether an exclusive lock or a shared lock can be obtained and whether the page is free or mapped, according to the procedure depicted in FIG. 4. Note that in the event that only a shared lock on page 152*h* can be obtained (block 460), and if page 152*h* is free but the shared lock cannot be upgraded to an exclusive lock (bock 474), the attempt to remove the hole (e.g., to set the P_KERNEL bit for page 152*h*) will fail, as depicted in FIG. 4. However, if an exclusive lock can be obtained (block 420), or only the shared lock can be initially be obtained (block 460) and either the page is not free (block 468) or the page is free and the shared lock can then be upgraded to an exclusive lock (block 474), at least the page can be marked as a relocatable kernel page and then will be added to the kernel page-freelist either as part of de-fragmentation (block 442) or later when the page is free (block 468).

Note that typically, a check of the P_KERNEL bit between the unlocked page and the first small page of the corresponding large page will not show that the P_KERNEL bit is set on the unlocked page but not on the first small page. The reason is that the P_KERNEL bit on the unlocked page would be set as part of the de-fragmentation procedure, which would also result in the P_KERNEL bit on the first small page also being set. In the rare event that the P_KERNEL bit on the first small page could not be set, and thus the unlocked page would be different than the first small page, hole removal thread 122 could identify the first small page as the hole, and in this case, set the P_KERNEL bit on the first small page instead of on the unlocked page.

The removal of holes when pages are unlocked can most quickly remove any holes, but at the expense of consuming the most system resources of the techniques described herein because of the need to check whether the first small page within the large page is marked as a relocatable kernel page and because such a check is done for each page as the page is unlocked.

5.3 Removing a Hole When a User Page is Freed

In one implementation, when a page is freed, a check is made to determine if the page is a hole, and if so, the page is marked as a kernel page. For example, whenever a page is freed, hole removal thread 122 can be started or awakened, and then hole removal thread 122 checks the starting pfn of the large page to which the unlocked page belongs. Then hole removal thread 122 compares the P_KERNEL bit of the first small page to the P_KERNEL bit of the freed page. If the P_KERNEL bits are the same (e.g., either both are set, thereby indicating that both are kernel pages, or both are not set, thereby indicating that both are user pages), nothing is done and hole removal thread 122 goes back to sleep.

However, if the P_KERNEL bits are not the same between the freed page and the first small page within the large page, then the P_KERNEL bit on the freed page is changed, such as by obtaining the exclusive lock on the page to be changed and then setting the P_KERNEL bit to "1." Thus, the technique of removing holes when pages are freed is essentially the same as the technique of removing holes when pages are unlocked, except that a different type of triggering event (e.g., freeing up of the page) is used (e.g., vs. unlocking the page).

As a specific example, if page 152*f* in FIG. 1C is freed, the P_KERNEL bit for page 152*f* (which is set to "1" because page 152*f* is depicted as a kernel page in FIG. 1C) is compared to the P_KERNEL bit for the first page within large page 154*b*, which is page 152*e* (for which the P_KERNEL bit is also set to "1"). Because the P_KERNEL bit is set for both pages 152*f* and 152*e*, nothing is changed, which reflects that page 152*f* is not a hole within large page 154*b* that has been processed according to the de-fragmentation procedure. Similarly, if page 152*b* in FIG. 1C is freed, the P_KERNEL bit for page 152*b* (e.g., "0" since page 152*b* is depicted as a user page) is compared to the P_KERNEL bit for page 152*a* (e.g., the first page of large page 154*a*, for which the P_KERNEL bit is also set to "0"). Because the P_KERNEL bit is not set for both pages 152*b* and 152*a*, nothing is changed, which reflects that large page 154*a* has not been processed according to the de-fragmentation procedure, as indicated by page 152*a* still being a user page instead of a kernel page.

However, if page 152*h* is freed, the P_KERNEL bit for page 152*h* (which is "0" because page 152*h* is depicted as a user page in FIG. 1C), is compared to the P_KERNEL bit for the first page within large page 154*b*, which is page 152*e* (for which the P_KERNEL bit is also set to "1"). Because the P_KERNEL bit is set for page 152*e* but not for page 152*h*, at attempt is made to set the P_KERNEL bit for page 152*h*, thereby changing the value "0" to "1" to indicated that page 152*h* is a kernel page, as depicted in FIG. 1D.

In this situation, page 152*h* was a hole after the de-fragmentation procedure was performed, perhaps due to page 152*h* being used by application C 132*c* thereby preventing de-fragmentation thread 114 from obtaining the necessary locks to set the P_KERNEL bit. Now that page 152*h* is freed, hole removal thread 122 can attempt to obtain the necessary locks, as described above with respect to FIG. 4, and as a result, hole removal thread 122 may be able to mark page 152*h* as a relocatable kernel thread.

Whether or not hole removal thread 122 can successfully mark the freed page as a relocatable kernel page depends on whether an exclusive lock or a shared lock can be obtained, according to the procedure depicted in FIG. 4. Note that in the event that only a shared lock on page 152*h* can be obtained (block 460), and if the shared lock cannot be upgraded to an exclusive lock (bock 474), the attempt to remove the hole (e.g., to set the P_KERNEL bit for page 152*h*) will fail, as depicted in FIG. 4. However, if an exclusive lock can be obtained (block 420) with the page being free (block 430), or the shared lock can be obtained (block 460) with the page being free (block 468) and the shared lock can be upgraded to an exclusive lock (block 474), the page can be marked as a relocatable kernel page and then will be added to the kernel page-freelist (block 442).

As discussed above with respect to removing holes when a page is unlocked, typically, a check of the P_KERNEL bit between the unlocked page and the first small page of the corresponding large page will not show that the P_KERNEL bit is set on the unlocked page but not on the first small page. The reason is that the P_KERNEL bit on the unlocked page would be set as part of the de-fragmentation procedure, which would also result in the P_KERNEL bit on the first small page also being set. In the rare event that the P_KERNEL bit on the first small page could not be set, and thus the unlocked page would be different than the first small page, hole removal thread 122 could identify the first small page as the hole, and in this case, set the P_KERNEL bit on the first small page instead of on the unlocked page.

The removal of holes when pages are freed can remove holes quickly, although not as quickly as removing holes when pages are unlocked since there may be pages that can be marked as relocatable kernel pages when unlocked but which are not free and because pages are more frequently unlocked than freed. However, the use of system resources, and therefore the performance impact on the system, of removing holes when pages are freed instead of when pages are unlocked is less because the checking of the first small page in the large page is performed less frequently due to pages being freed less frequently than pages being unlocked.

5.4 "Automatic" Removal of Holes

In one implementation, holes are removed "automatically" without the need to use any of the hole removal techniques described above by simply doing nothing extra, but simply by using the de-fragmentation procedure with a single pass for each large page. In this approach, when the de-fragmentation process is initiated (e.g., when the kernel page-freelist is empty, etc.), large pages that were previously processed according to the de-fragmentation procedure are processed again at later times as a result of a hole being used as the initial page to be processed by being listed first on the user page-freelist.

As a specific example, consider page 152h in FIG. 1C and that only a single pass of the de-fragmentation procedure was made for large page 154b, leaving page 152h as a hole. Page 152h can still be removed as a hole and marked as a kernel page at a later time in a subsequent application of the de-fragmentation process to large page 154b in one of two ways.

First, at some later time, page 152h will likely be freed and then be added to user page-freelist 142. As some point, page 152h will be the first page listed in user page-freelist 142 when the de-fragmentation process begins. As a result, large page 154b is processed again, starting by setting the P_KERNEL bit for page 152h to indicate that page 152h is a relocated kernel page. The remaining pages of large page 154b are then processed according to FIG. 4, and any other holes within large page 154b may then be removed during this later pass of the de-fragmentation procedure. Because page 152h is the starting page for the de-fragmentation process by virtue of being listed first in user page-freelist 142, removal of page 152h as a hole is assured, and additional holes within large page 154b may also be removed.

The second way page 152h can be removed as a hole is when large page 152h is processed again according to the de-fragmentation procedure, but in this case, another hole within large page 154b is starting point, and page 152h is processed during the pass through the rest of the pages within large page 154b. In this situation, page 152h may or may not be removed as a hole, depending on whether the necessary locks can be obtained. The removal of page 152h as a hole is not guaranteed during this subsequent application of the de-fragmentation process because page 152h may still be in use by another application (e.g., another application has the exclusive lock, etc.).

Thus, whether page 152h is used as the starting page for a later application of the de-fragmentation procedure to large page 154b, or whether some other page within large page 154b was the starting point, page 152h is going to be processed by de-fragmentation thread 114 again and again, and eventually given a sufficiently long time period, page 152h will be marked as a relocatable kernel page. Therefore, even in the absence of any of the other hole removal techniques, over time, holes are removed as part of the basic de-fragmentation procedure. Whether the time required for this to occur is acceptable to the user depends on the particular performance of a given computing system, and as a result, if the time is too great, one or more of the other hole removal techniques may be employed.

6.0 Implementation Mechanisms

The approach for de-fragmenting physical memory described herein may be implemented in a variety of ways and the invention is not limited to any particular implementation. The approach may be integrated into a YYY system or a ZZZ device, or may be implemented as a stand-alone mechanism. Furthermore, the approach may be implemented in computer software, hardware, or a combination thereof.

Figure 6:
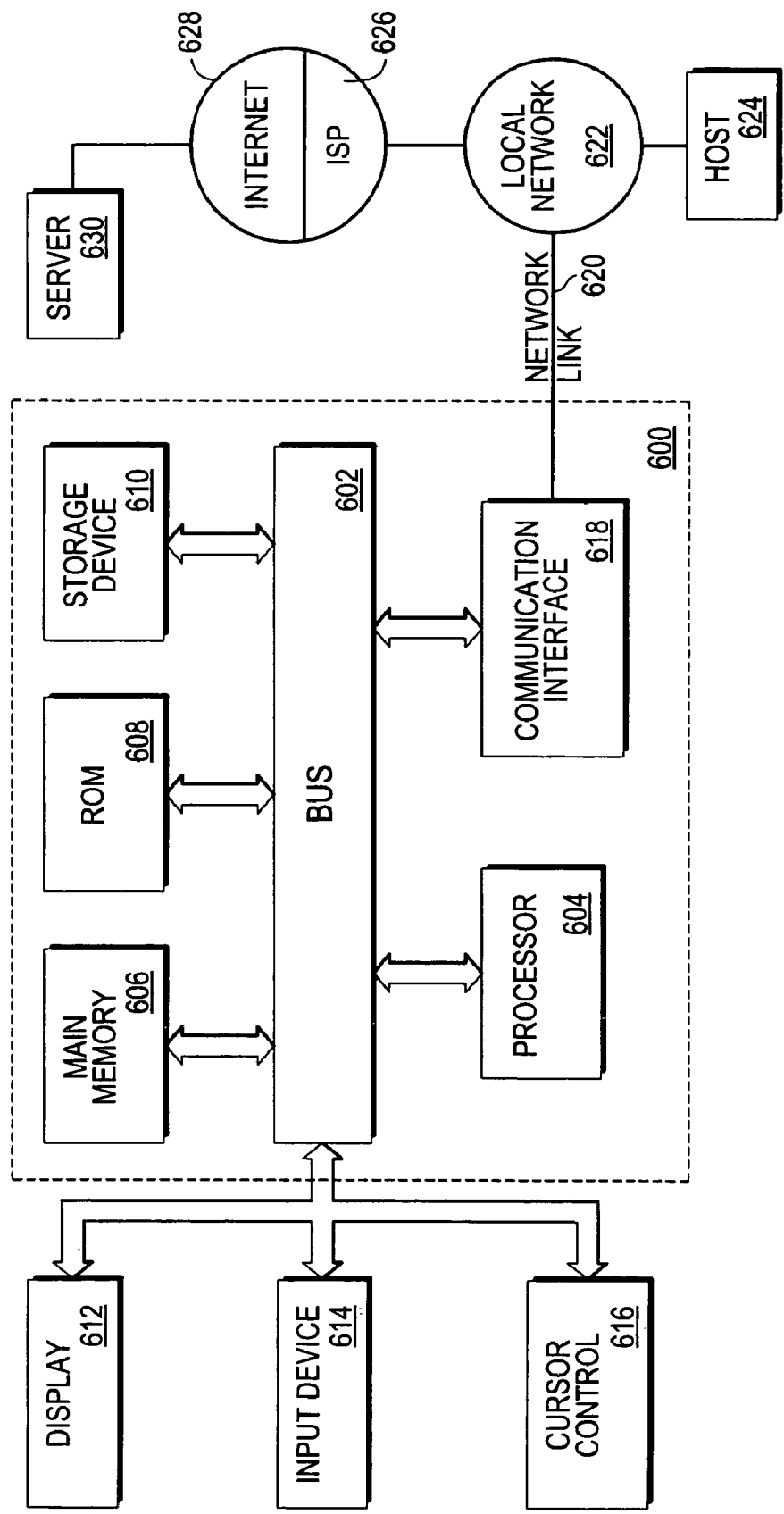
FIG. 6 is a block diagram that depicts a computer system upon which embodiments of the invention may be implemented.

FIG. 6 is a block diagram that depicts a computer system 600 upon which an embodiment may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a m . A m local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a m to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

7.0 Extensions and Alternatives

7.1 General Considerations

In the foregoing description, the invention has been described with reference to specific embodiments thereof. It will, however, be evident that various modifications and changes may be made thereto without departing from the broader spirit and scope of the invention. For example, although examples have depicted the use of a P_KERNEL bit to mark pages as kernel pages, the P_KERNEL bit is used for explanation purposes only as embodiments of the invention are not limited to any particular type of manner of marking pages as kernel pages. Thus, the specification and drawings are, accordingly, to be regarded in an illustrative rather than a restrictive sense. The invention includes other contexts and applications in which the mechanisms and processes described herein are available to other mechanisms, methods, programs, and processes.

In addition, in this description, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or fewer steps than those discussed herein.

Finally, several particular variations of the techniques described above are briefly enumerated in the following subsections. However, the following serve as examples of the types of different implementations and variations of the techniques described herein, and other variations or changes other than those described below may be employed in particular implementations.

7.2 Populating a User Page-Freelist

The techniques described above focused on populating a kernel page-freelist by processing a large page according to the de-fragmentation procedure and marking pages as kernel pages. However, the reverse can also be done, namely by applying the de-fragmentation procedure to large pages and marking pages as user pages (e.g., unsetting the P_KERNEL bit). For example, when a user page-freelist is empty or has fewer than a specified number of pages, the first kernel page in the kernel page-freelist can be selected and the associated large page processed to change the P_KERNEL bits from "1" to "0" for the individual pages within the large page.

As yet another variation, both populating a kernel page-freelist and populating a user page-freelist can be employed together. This can result in a quicker segregation of user pages and kernel pages according to the corresponding large pages. However, care should be taken to balance the triggering parameters to avoid wasting system resources by continually changing user pages into kernel pages and vice versa.

7.3 Multiple Large Page Sizes

The examples described above include two page sizes—small and large. However, the techniques described herein can be applied to systems employing multiple large page sizes, such as 64K, 512K, and 4 MB in a system with a minimum page size of 8K. For example, multiple page-freelists for each large page size can be used, and the de-fragmentation procedure can be triggered by any of the large user page-freelists being empty, falling below a specified number, etc.

Also, instead of just processing the smallest pages (e.g., the 8K pages) within a particular large page, smaller large pages within a bigger large page can be handled in the same manner (e.g., processing the 64K pages within a 4 MB page). Finally, although the examples above are described using a single kernel page-freelist having kernel pages of just one size (e.g., the 8K size), multiple kernel page sizes can be used.

7.4 Separate vs. Combined Page-Freelists for User Pages and Kernel Pages

In the examples above, a kernel page-freelist is used that is separate from the small and large user page-freelists. However, in other implementations, the same page-freelist can be used for both user and kernel pages, with the different types of pages being marked to distinguish user pages from kernel pages (e.g., based on the P_KERNEL bit or by some other suitable approach).

As a specific example, when the combined list is accessed to obtain a specified type of free page, the first free page of the specified type is obtained. As another example, the number of pages of each type can be tracked, and when the current number of pages of a specified type falls below a specified level, the de-fragmentation process is triggered to populate the combined page-freelist with more pages of the specified type.

What is claimed is:

1. A machine-readable storage medium storing instructions for managing a physical memory, comprising:
    identifying, in the physical memory, a first large page comprising a first user page, a second user page, and an original kernel page, wherein the first large page is a contiguous region in the physical memory;
    selecting, from a user page-freelist, the first user page of the first large page;
    changing a first indicator for the first user page to designate that the first user page is changed to a first kernel page;
    moving the first kernel page to a kernel page-freelist;
    selecting, from the first large page, the second user page;
    determining that the second user page can be added to the kernel page-freelist;
    changing a second indicator for the second user page to designate that the second user page is changed to a second kernel page;
    adding the second kernel page to the kernel page-freelist, wherein after adding the second kernel page to the kernel page-freelist, the first large page includes only kernel pages, and wherein the kernel page-freelist comprises a plurality of kernel pages and excludes user pages; and
    coalescing the original kernel page, the first kernel page, and the second kernel page into a first coalesced large page, wherein the first coalesced large page is a contiguous free region in the physical memory that includes memory regions of the original kernel page, the first kernel page, and the second kernel page.

2. The machine-implemented method of claim 1, further comprising:
    selecting, from the first large page, an additional user page;
    determining that the additional user page cannot be added to the kernel page-freelist; and
    skipping the additional user page.

3. The machine-implemented method of claim 1, further comprising:
    selecting, from the first large page, a third user page;
    determining that the third user page cannot be added to the kernel page-freelist;
    changing a third indicator for the third user page to designate that the third user page is changed to a third relocatable kernel page;
    relocating the third relocatable kernel page; and
    after relocating the third relocatable kernel page, adding the third relocatable kernel page to the kernel page-freelist.

4. The machine-implemented method of claim 1, further comprising:
    selecting, from the first large page, a third user page;
    determining that the third user page cannot be added to the kernel page-freelist;
    unlocking the third user page;
    after the third user page is unlocked, determining that the third user page can be added to the kernel page-freelist;
    changing a third indicator for the third user page to designate that the third user page is changed to a third kernel page; and
    adding the third kernel page to the kernel page-freelist.

5. The machine-implemented method of claim 1, further comprising:
    selecting, from the first large page, a third user page;
    determining that the third user page cannot be added to the kernel page-freelist;
    receiving an indication that the third user page is free;
    after the third user page becomes free, determining that the third user page can be added to the kernel page-freelist;
    changing a third indicator for the third user page to designate that the third user page is changed to a third kernel page; and
    adding the third kernel page to the kernel page-freelist.

6. The machine-implemented method of claim 1, wherein determining that the second user page can be added to the kernel page-freelist comprises:
    determining that an exclusive lock can be obtained for the second user page; and
    determining whether the second user page is free or mapped.

7. The machine-implemented method of claim 6, further comprising:
    determining that the second user page is free; and
    determining that the second user page can be added to the kernel page-freelist.

8. The machine-implemented method of claim 6, further comprising:
    determining that the second user page is mapped;
    relocating the second user page; and
    after the second user page is relocated, determining that the second user page can be added to the kernel page-freelist.

9. The machine-implemented method of claim 1, wherein determining that the second user page can be added to the kernel page-freelist comprises:
- determining that an exclusive lock can be obtained for the second user page;
- determining that a shared lock can be obtained for the second user page;
- determining that the second user page is free;
- after determining that the second user page is free, determining that the shared lock can be upgraded to the exclusive lock; and
- determining that the second user page can be added to the kernel page-freelist.

10. The machine-implemented method of claim 1, further comprising:
- identifying, in the physical memory, a second large page comprising a first relocatable kernel page, a second relocatable kernel page, and an original user page, wherein the second large page is a second contiguous region in the physical memory;
- selecting, from the kernel page-freelist, the first relocatable kernel page of the second large page;
- changing a first kernel indicator for the first relocatable kernel page to designate that the first relocatable kernel page is changed to a first free user page;
- moving the first free user page to the user page-freelist;
- selecting, from the second large page, the second relocatable kernel page;
- determining that the second relocatable kernel page can be added to the user page-freelist;
- changing a second kernel indicator for the second relocatable kernel page to designate that the second relocatable kernel page is changed to a second free user page;
- adding the second free user page to the user page-freelist, wherein after adding the second free user page to the user page-freelist, the second large page includes only user pages, wherein user pages are segregated from kernel pages in the first large page and the second large page in the physical memory; and
- coalescing the first free user page, the second free user page, and the original user page into a second coalesced large page, wherein the second coalesced large page is a contiguous free region in the physical memory that includes the memory regions of the first free user page, the second free user page, and the original user page.

11. A machine-readable storage medium storing instruction for managing a physical memory, the instructions executable on a processor and comprising functionality for:
- identifying, in the physical memory, a first large page comprising a first user page, a second user page, and an original kernel page, wherein the first large page is a contiguous region in the physical memory;
- selecting, from a user page-freelist, the first user page of the first large page;
- changing a first indicator for the first user page to designate that the first user page is changed to a first kernel page;
- moving the first kernel page to a kernel page-freelist;
- selecting, from the first large page, the second user page;
- determining that the second user page can be added to the kernel page-freelist;
- changing a second indicator for the second user page to designate that the second user page is changed to a second kernel page;
- adding the second kernel page to the kernel page-freelist, wherein after adding the second kernel page to the kernel page-freelist, the first large page includes only kernel pages, and wherein the kernel page-freelist comprises a plurality of kernel pages and excludes user pages; and
- coalescing the original kernel page, the first kernel page, and the second kernel page into a first coalesced large page, wherein the first coalesced large page is a contiguous free region in the physical memory that includes memory regions of the original kernel page, the first kernel page, and the second kernel page.

12. The machine-readable storage medium of claim 11, the instructions further comprising functionality for:
- selecting, from the first large page, an additional user page;
- determining that the additional user page cannot be added to the kernel page-freelist; and
- skipping the additional user page.

13. The machine-readable storage medium of claim 11, the instructions further comprising functionality for:
- selecting, from the first large page, a third user page;
- determining that the third user page cannot be added to the kernel page-freelist;
- changing a third indicator for the third user page to designate that the third user page is changed to a third relocatable kernel page;
- relocating the third relocatable kernel page; and
- after relocating the third relocatable kernel page, adding the third relocatable kernel page to the kernel page-freelist.

14. The machine-readable storage medium of claim 11, the instructions further comprising functionality for:
- selecting, from the first large page, a third user page;
- determining that the third user page cannot be added to the kernel page-freelist;
- unlocking the third user page;
- after the third user page is unlocked, determining that the third user page can be added to the kernel page-freelist;
- changing a third indicator for the third user page to designate that the third user page is changed to a third kernel page; and
- adding the third kernel page to the kernel page-freelist.

15. The machine-readable storage medium of claim 11, the instructions further comprising functionality for:
- selecting, from the first large page, a third user page;
- determining that the third user page cannot be added to the kernel page-freelist;
- receiving an indication that the third user page is free;
- after the third user page becomes free, determining that the third user page can be added to the kernel page-freelist;
- changing a third indicator for the third user page to designate that the third user page is changed to a third kernel page; and
- adding the third kernel page to the kernel page-freelist.

16. The machine-readable storage medium of claim 11, wherein the instructions for determining that the second user page can be added to the kernel page-freelist further comprise functionality for:
- determining that an exclusive lock can be obtained for the second user page; and
- determining whether the second user page is free or mapped.

17. The machine-readable storage medium of claim 16, the instructions further comprising functionality for:
- determining that the second user page is free; and
- determining that the second user page can be added to the kernel page-freelist.

18. The machine-readable storage medium of claim 16, the instructions further comprising functionality for:
- determining that the second user page is mapped;
- relocating the second user page; and after the second user page is relocated, determining that the second user page can be added to the kernel page-freelist.

19. The machine-readable storage medium of claim 11, wherein the instructions for determining that the second user page can be added to the kernel page-freelist further comprise functionality for:
   determining that an exclusive lock can be obtained for the second user page;
   determining that a shared lock can be obtained for the second user page;
   determining that the second user page is free;
   after determining that the second user page is free, determining that the shared lock can be upgraded to the exclusive lock; and
   determining that the second user page can be added to the kernel page-freelist.

20. The machine-readable storage medium of claim 11, the instructions further comprising functionality for:
   identifying, in the physical memory, a second large page comprising a first relocatable kernel page, a second relocatable kernel page, and an original user page, wherein the second large page is a second contiguous region in the physical memory;
   selecting, from the kernel page-freelist, the first relocatable kernel page of the second large page;
   changing a first kernel indicator for the first relocatable kernel page to designate that the first relocatable kernel page is changed to a first free user page;
   moving the first free user page to the user page-freelist;
   selecting, from the second large page, the second relocatable kernel page;
   determining that the second relocatable kernel page can be added to the user page-freelist;
   changing a second kernel indicator for the second relocatable kernel page to designate that the second relocatable kernel page is changed to a second free user page;
   adding the second free user page to the user page-freelist, wherein after adding the second free user page to the user page-freelist, the second large page includes only user pages, wherein user pages are segregated from kernel pages in the first large page and the second large page in the physical memory; and
   coalescing the first free user page, the second free user page, and the original user page into a second coalesced large page, wherein the second coalesced large page is a contiguous free region in the physical memory that includes the memory regions of the first free user page, the second free user page, and the original user page.

21. An apparatus for managing a physical memory, comprising:
   a mechanism for identifying, in the physical memory, a first large page comprising a first user page, a second user page, and an original kernel page, wherein the first large page is a contiguous region in the physical memory;
   a mechanism for selecting from a user page-freelist, the first user page of the first large page;
   a mechanism for changing a first indicator for the first user page to designate that the first user page is changed to a first kernel page;
   a mechanism for moving the first kernel page to a kernel page-freelist;
   a mechanism for selecting, from the first large page, the second user page;
   a mechanism for determining that the second user page can be added to the kernel page-freelist;
   a mechanism for changing a second indicator for the second user page to designate that the second user page is changed to a second kernel page;
   a mechanism for adding the second kernel page to the kernel page-freelist, wherein after adding the second kernel page to the kernel page-freelist, the first large page includes only kernel pages, and wherein the kernel page-freelist comprises a plurality of kernel pages and excludes user pages; and
   a mechanism for coalescing the original kernel page, the first kernel page, and the second kernel page into a first coalesced large page, wherein the first coalesced large page is a contiguous free region in the physical memory that includes memory regions of the original kernel page, the first kernel page, and the second kernel page.

22. The apparatus of claim 21, further comprising:
   a mechanism for selecting, from the first large page, an additional user page;
   a mechanism for determining that the additional user page cannot be added to the kernel page-freelist; and
   a mechanism for skipping the additional user page.

23. The apparatus of claim 21, further comprising:
   a mechanism for selecting, from the first large page, a third user page;
   a mechanism for determining that the third user page cannot be added to the kernel page-freelist;
   a mechanism for changing a third indicator for the third user page to designate that the third user page is changed to a third relocatable kernel page;
   a mechanism for relocating the third relocatable kernel page; and
   a mechanism for adding the third relocatable kernel page to the kernel page-freelist, after relocating the third relocatable kernel page.

24. The apparatus of claim 21, further comprising:
   a mechanism for selecting, from the first large page, a third user page;
   a mechanism for determining that the third user page cannot be added to the kernel page-freelist;
   a mechanism for unlocking the third user page;
   a mechanism for determining, after the third user page is unlocked, that the third user page can be added to the kernel page-freelist;
   a mechanism for changing a third indicator for the third user page to designate that the third user page is changed to a third kernel page; and
   a mechanism for adding the third kernel page to the kernel page-freelist.

25. The apparatus of claim 21, further comprising:
   a mechanism for selecting, from the first large page, a third user page;
   a mechanism for determining that the third user page cannot be added to the kernel page-freelist;
   a mechanism for receiving an indication that the third user page is free;
   a mechanism for determining that the third user page can be added to the kernel page-freelist, after the third user page becomes free;
   a mechanism for changing a third indicator for the third user page to designate that the third user page is changed to a third kernel page; and
   a mechanism for adding the third kernel page to the kernel page-freelist.

26. The apparatus of claim 21, wherein the mechanism for determining that the second user page can be added to the kernel page-freelist further comprises:

a mechanism for determining that an exclusive lock can be obtained for the second user page; and
a mechanism for determining whether the second user page is free or mapped.

27. The apparatus of claim 26, further comprising:
a mechanism for determining that the second user page is free; and
a mechanism for determining that the second user page can be added to the kernel page-freelist.

28. The apparatus of claim 26, further comprising:
a mechanism for determining that the second user page is mapped;
a mechanism for relocating the second user page; and
a mechanism for determining, after the second user page is relocated, that the second user page can be added to the kernel page-freelist.

29. The apparatus of claim 21, wherein the mechanism for determining that the second user page can be added to the kernel page-freelist further comprises:
a mechanism for determining that an exclusive lock can be obtained for the second user page;
a mechanism for determining that a shared lock can be obtained for the second user page;
a mechanism for determining that the second user page is free;
a mechanism for determining that the shared lock can be upgraded to the exclusive lock, after determining that the second user page is free; and
a mechanism for determining that the second user page can be added to the kernel page-freelist.

30. The apparatus of claim 21, further comprising:
a mechanism for identifying, in the physical memory, a second large page comprising a first relocatable kernel page, a second relocatable kernel page, and an original user page, wherein the second large page is a second contiguous region in the physical memory;
a mechanism for selecting, from the kernel page-freelist, the first relocatable kernel page of the second large page;
a mechanism for changing a first kernel indicator for the first relocatable kernel page to designate that the first relocatable kernel page is changed to a first free user page;
a mechanism for moving the first free user page to the user page-freelist;
a mechanism for selecting, from the second large page, the second relocatable kernel page;
a mechanism for determining that the second relocatable kernel page can be added to the user page-freelist;
a mechanism for changing a second kernel indicator for the second relocatable kernel page to designate that the second relocatable kernel page is changed to a second free user page;
a mechanism for adding the second free user page to the user page-freelist, wherein after adding the second free user page to the user page-freelist, the second large page includes only user pages, wherein user pages are segregated from kernel pages in the first large page and the second large page in the physical memory; and
a mechanism for coalescing the first free user page, the second free user page, and the original user page into a second coalesced large page, wherein the second coalesced large page is a contiguous free region in the physical memory that includes the memory regions of the first free user page, the second free user page, and the original user page.

* * * * *

UNITED STATES PATENT AND TRADEMARK OFFICE
CERTIFICATE OF CORRECTION

| | | |
|---|---|---|
| PATENT NO. | : 7,802,070 B2 | Page 1 of 1 |
| APPLICATION NO. | : 11/452768 | |
| DATED | : September 21, 2010 | |
| INVENTOR(S) | : Udayakumar Cholleti et al. | |

It is certified that error appears in the above-identified patent and that said Letters Patent is hereby corrected as shown below:

In Claim 1, Column 29 (lines 44-45) "machine-readable storage medium storing instructions" should read --machine-implemented method--.

In Claim 11, Column 31 (lines 46-47) "instruction" should read --instructions--.

Signed and Sealed this
Twenty-eighth Day of June, 2011

David J. Kappos
*Director of the United States Patent and Trademark Office*